United States Patent
Tian et al.

(10) Patent No.: US 11,751,152 B2
(45) Date of Patent: Sep. 5, 2023

(54) SSB STRUCTURE FOR NR COMMUNICATIONS

(71) Applicant: QUALCOMM Incorporated, San Diego, CA (US)

(72) Inventors: Qingjiang Tian, San Diego, CA (US); Xiaoxia Zhang, San Diego, CA (US); Jing Sun, San Diego, CA (US); Zhifei Fan, San Diego, CA (US); Arumugam Chendamarai Kannan, San Diego, CA (US); Jun Ma, San Diego, CA (US); Tao Luo, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 76 days.

(21) Appl. No.: 17/451,994

(22) Filed: Oct. 22, 2021

(65) Prior Publication Data

US 2022/0150851 A1    May 12, 2022

Related U.S. Application Data

(60) Provisional application No. 63/110,894, filed on Nov. 6, 2020.

(51) Int. Cl.
*H04W 56/00* (2009.01)
*H04L 27/26* (2006.01)
*H04L 5/00* (2006.01)

(52) U.S. Cl.
CPC ......... *H04W 56/001* (2013.01); *H04L 5/0051* (2013.01); *H04L 27/26025* (2021.01)

(58) Field of Classification Search
CPC .......... H04L 27/21025; H04L 27/2611; H04L 5/005; H04L 5/0051; H04L 5/0048; H04W 56/001
See application file for complete search history.

(56) References Cited

U.S. PATENT DOCUMENTS

| | | | |
|---|---|---|---|
| 2018/0220360 A1* | 8/2018 | Sheng | H04W 48/10 |
| 2019/0037509 A1* | 1/2019 | Li | H04L 27/0006 |

(Continued)

FOREIGN PATENT DOCUMENTS

| | | | | |
|---|---|---|---|---|
| CN | 109041199 B | * | 3/2021 | H04W 56/001 |
| DE | 102021109367 A1 | * | 10/2021 | |

(Continued)

*Primary Examiner* — Phong La
(74) *Attorney, Agent, or Firm* — Arent Fox, LLP

(57) ABSTRACT

In one aspect, an extended SSB (ESSB) is provided that includes more than four symbols to facilitate UE reception of SSBs. In this aspect, the base station configures an ESSB comprising an SSB including four symbols and an initial symbol preceding the SSB. The base station transmits and the UE receives at least a portion of the ESSB. The UE processes the ESSB. Thus, higher capacity UEs can benefit from additional coding gain in the initial symbol while lower capacity UEs can switch beams to receive back-to-back ESSBs. In another aspect, a UE performs additional behaviors to receive SSBs. In this aspect, the UE receives a first SSB using a reception beam, and the UE determines to maintain the reception beam for a second SSB or to switch the reception beam during a PSS symbol of the second SSB. Thus, lower capacity UEs can also receive back-to-back SSBs.

27 Claims, 14 Drawing Sheets

(56) References Cited

U.S. PATENT DOCUMENTS

2021/0136703 A1* 5/2021 Kundargi .............. H04W 72/23
2022/0150851 A1* 5/2022 Tian ...................... H04L 5/0051
2022/0322252 A1* 10/2022 Chen ................. H04W 74/0858

FOREIGN PATENT DOCUMENTS

| WO | 2018237032 A1 | 12/2018 | |
| WO | WO-2019062778 A1 * | 4/2019 | ........... H04B 7/0408 |
| WO | WO-2021216937 A1 * | 10/2021 | ............. H04B 7/024 |
| WO | WO-2022049733 A1 * | 3/2022 | |

* cited by examiner

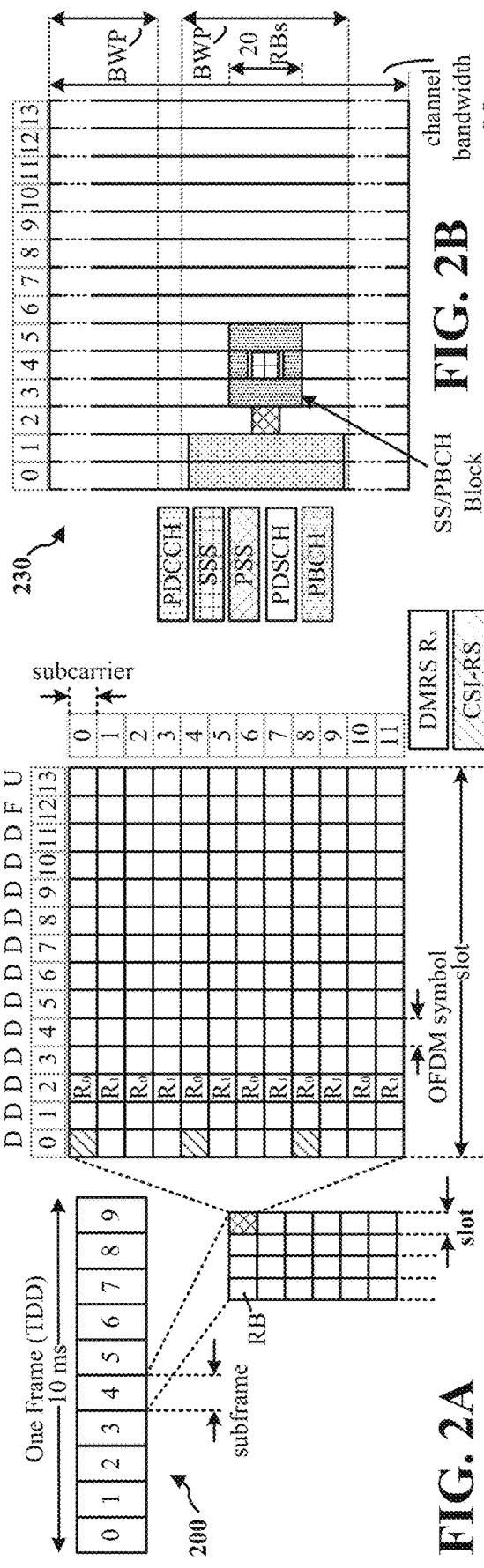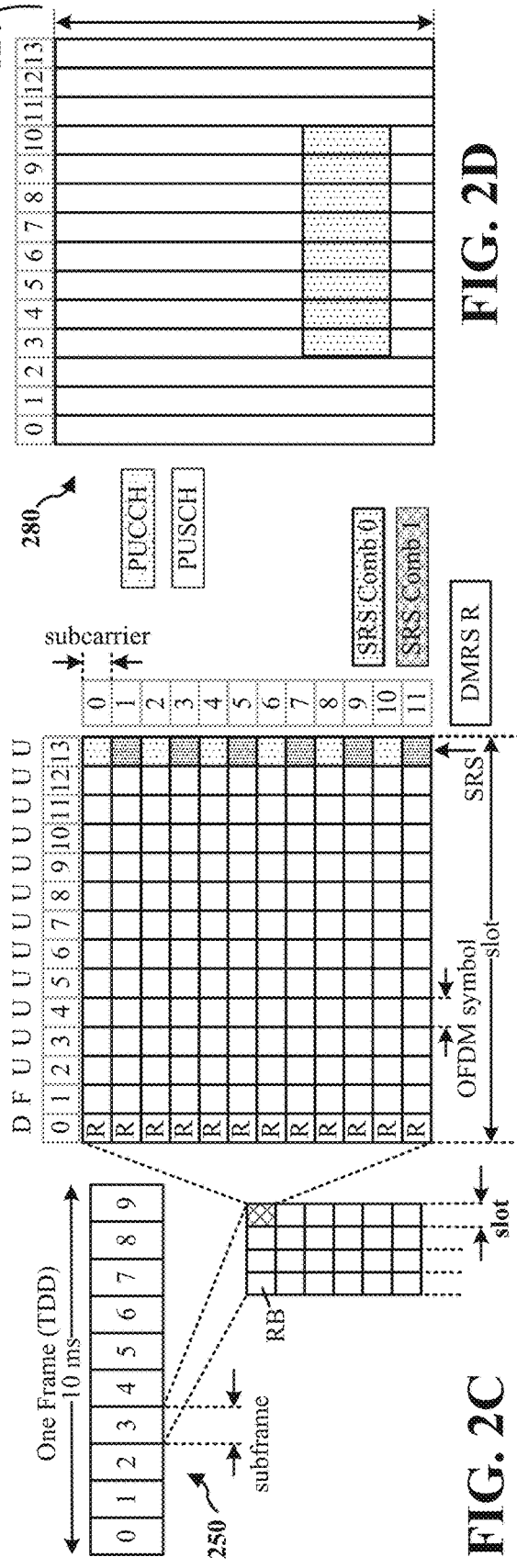
FIG. 2A
FIG. 2B
FIG. 2C
FIG. 2D

SSB STRUCTURE FOR NR COMMUNICATIONS

CROSS REFERENCE TO RELATED APPLICATION(S)

This application claims the benefit of U.S. Provisional Application Ser. No. 63/110,894, entitled "SSB STRUCTURE FOR NR COMMUNICATIONS" and filed on Nov. 6, 2020, the disclosure of which is expressly incorporated by reference herein in its entirety.

BACKGROUND

Technical Field

The present disclosure generally relates to communication systems, and more particularly, to a wireless communication system between a user equipment (UE) and a base station.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The apparatus receives, from a base station, an extended synchronization signal block (ESSB), where the ESSB comprises a synchronization signal block (SSB) including four symbols and an initial symbol preceding the SSB. The apparatus processes the ESSB.

In an aspect of the disclosure, a method, a computer-readable medium, and an apparatus are provided. The apparatus may be a UE. The apparatus receives a first SSB using a reception beam. The apparatus determines to maintain the reception beam for a second SSB or to switch the reception beam during a primary synchronization signal (PSS) symbol of the second SSB.

In an aspect of the disclosure, a method, a computer-readable medium, and an apparatus are provided. The apparatus may be a base station. The apparatus configures an ESSB, where the ESSB comprises an SSB including four symbols and an initial symbol preceding the SSB. The apparatus transmits to a UE at least a portion of the ESSB.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
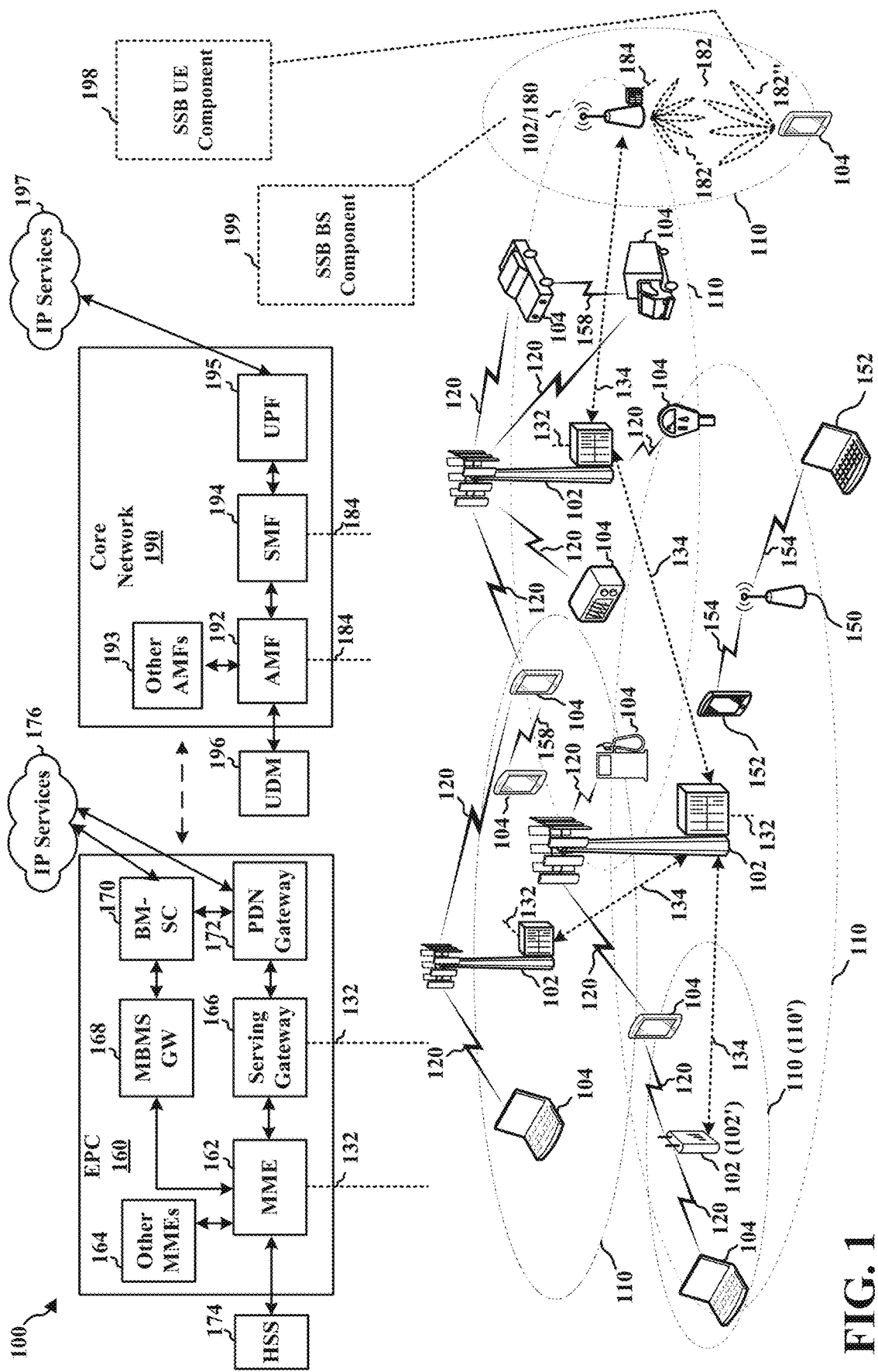
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The UE may search for a cell of a base station for initial access (e.g. during a random access channel (RACH) procedure), for cell re-selection (e.g. during a handover), or for other purposes. To derive system information to access the cell, the UE may obtain a SSB including a PSS, a secondary synchronization signal (SSS), and a physical broadcast channel (PBCH). The UE may also measure reference signal received power (RSRP) and reference signal receive quality (RSRQ) from the synchronization signals for other purposes (e.g. radio link monitoring (RLM) or radio resource management (RRM)).

The base station may transmit an SSB according to a configured periodicity. For example, the base station may transmit SSB periodically every 5 ms, 10 ms, 20 ms, 40 ms, 80 ms, or 160 ms. The base station may also configure an SSB-based RRM Measurement Timing Configuration (SMTC) window informing the UE regarding an SSB measurement window periodicity and timing for SSB measurements. For example, the base station may configure the UE to measure SSBs periodically every 5 ms, 10 ms, 20 ms, 40 ms, 80 ms, or 160 ms. The SMTC window periodicity may be the same as the SSB periodicity. The UE may receive and measure SSBs within each SMTC window and report measurements accordingly back to the base station.

To enable beam-sweeping for PSS, SSS and PBCH, the base station may also configure a SS burst set including a set of one or more SSBs, where each SSB in the SS burst set may potentially be transmitted on a different beam. The UE may similarly receive each SSB on a different beam. For instance, assuming an SSB periodicity of 20 ms or two 10 ms radio frames (and similarly an SMTC window periodicity of 20 ms), the base station may transmit an SSB burst set of one or more SSBs within a first-half or second-half of one of the radio frames (i.e. a 5 ms window within each 20 ms period), with each SSB being transmitted in a different beam. The base station may similarly configure the SMTC window duration to be the same as the SSB window (e.g. 5 ms). Thus, for example, the UE may receive and measure SSBs within a 5 ms window during each 20 ms period and report those measurements back to the base station.

The maximum number of candidate SSBs within each burst set may depend on the carrier frequency of the cell. For example, for frequencies above 6 GHz, at most 64 SSBs may be transmitted within a single SS burst set. Moreover, the starting OFDM symbol index for each candidate SSB within an SS burst set may depend on the carrier frequency of the cell and the subcarrier spacing (SCS). For example, for frequencies above 6 GHz, SSBs may be transmitted starting at OFDM symbols 4, 8, 16, and 20 for 120 kHz SCS and starting at OFDM symbols 8, 12, 16, 20, 32, 36, 40, and 44 for 240 kHz SCS. As each SSB generally includes four symbols, in multiple instances the SSBs may be transmitted back-to-back without gaps in between some of the SSBs.

Thus, patterns of SSBs may be configured which include at least some back-to-back SSBs, where each SSB may be transmitted and received on different beams in a given SS burst set. Depending on antenna capabilities, different base stations and UEs may switch their transmission and reception beams respectively for different SSBs within different periods of time. For example, a base station or UE that performs a beam switch instantaneously (or in less than 100 ns) may be considered a "high capability" base station or UE, while a base station or UE that requires at least 100 ns to perform a beam switch may be considered a "low capability" base station or UE. At lower numerologies (e.g. up to 120 kHz or 240 kHz SCS), the time within which the base station or UE may perform a beam switch may fall within a timing of a cyclic prefix (CP) for a back-to-back SSB, irrespective of whether the base station or UE is high or low capability. However, at higher frequency bands such as 52.6 GHz-71 GHz where higher numerologies such as 960 kHz SCS may be configured, the timing of the CP may no longer be sufficient for low capability base station and UE beam switching. For instance, CP timing at 960 kHz SCS may be less than 100 ns or otherwise less than the time required for a low capability base station or a low capability UE to perform beam switching for a back-to-back SSB. Although configuring a gap (e.g. an extra symbol) between such back-to-back SSBs may allow for low capability base station or UEs to successfully perform beam switching at such higher numerologies, such gaps may be inefficient for high capability base station or UEs that can adequately perform beam switching in the first place without such gaps.

To address this inefficiency, according to a first aspect of the disclosure, the base station may configure a different SSB structure that includes more than four symbols (e.g. five symbols). For example, the base station may configure an extended SSB (ESSB), which includes an additional symbol in comparison to the four symbol SSB described above. The additional symbol may be the initial symbol of the ESSB, thus preceding the SSB. The additional symbol may be a repetition of any of the other symbols in the four symbol SSB, thereby providing a coding gain in the ESSB relative to the SSB. The base station may also configure back-to-back, ESSBs (i.e. without gaps or intervening symbols between the ESSBs) with various time domain patterns. When the base station is a high capability base station that can beam switch without a gap between back-to-back ESSBs, the base station may transmit data in the additional symbol. Similarly, when the UE is a high capability UE that can beam switch without a gap between back-to-back ESSBs, the UE may receive data in the additional symbol. Otherwise, when the base station is a low capability base station, the base station may beam switch during a portion of the time period of the additional symbol (effectively using this portion as a gap between back-to-back ESSBs), or the base station may refrain from transmitting data in the additional symbol and instead use that time period to perform beam switching (as an actual gap between back-to-back ESSBs). Similarly, when the UE is a low capability UE, the UE may beam switch during a portion of the time period of the additional symbol (again effectively using this portion as a gap between back-to-back ESSBs), or the UE may ignore data received in the additional symbol and instead use that time period to perform beam switching (again as an actual gap between back-to-back ESSBs). Thus, high capability base station and UEs may benefit from the coding gain of back-to-back five symbol ESSBs, while low capability base station and UEs may still perform beam switching to receive such ESSBs without configuring hard gaps between such ESSBs.

Alternatively, according to a second aspect of the disclosure, if the base station is a high capability base station that can beam switch without gaps between back-to-back SSBs (i.e. four symbol SSBs), the base station may configure and transmit a four symbol SSB as previously described. While high capability UEs may successfully receive such SSBs since they can beam switch without gaps between back-to-back SSBs, low capability UEs may perform one or more additional behaviors to allow for reception of such SSBs. In one example, during initial access, the low capability UE may refrain from switching between back-to-back SSBs, and instead maintain the same reception beam between different SSBs. For SSBs which are not back-to-back and are thus separated by at least one intervening symbol, the UE may perform beam switching during the gap between those SSBs. In another example, during RLM or RRM, the low capability UE may beam switch during a symbol of the SSB which includes PSS (effectively using this PSS symbol as a gap between back-to-back SSBs), or the UE may refrain from switching between back-to-back SSBs and instead maintain the same reception beam. Alternatively, the low capability UE may not measure all back-to-back SSBs in a single SMTC window (e.g. the UE may measure a first SSB but not a second, subsequent SSB, or the UE may not measure any subsequent SSB, in the SMTC window). In such case, the base station may configure longer SMTC windows to allow the UE to monitor SSBs corresponding to different beams. Thus, low capability UEs may be able to receive four symbol SSBs without configuring hard gaps between such SSBs.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include an SSB UE component 198 that is configured to receive, from a base station, an ESSB, where the ESSB comprises an SSB including four symbols and an initial symbol preceding the SSB, and to process the ESSB. The SSB UE component 198 is also configured to receive a first SSB using a reception beam, and determine to maintain the reception beam for a second SSB or to switch the reception beam during a PSS symbol of the second SSB.

Still referring to FIG. 1, in certain aspects, the base station 102/180 may include an SSB BS component 199 that is configured to configure an ESSB, where the ESSB comprises an SSB including four symbols and an initial symbol preceding the SSB, and to transmit to a UE at least a portion of the ESSB.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kilohertz (kHz), where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgement (ACK)/non-acknowledgement (NACK) feedback. The PUSCH carries data, and may additionally be used to carry a buffer status report (BSR), a power headroom report (PHR), and/or UCI.

Figure 3:
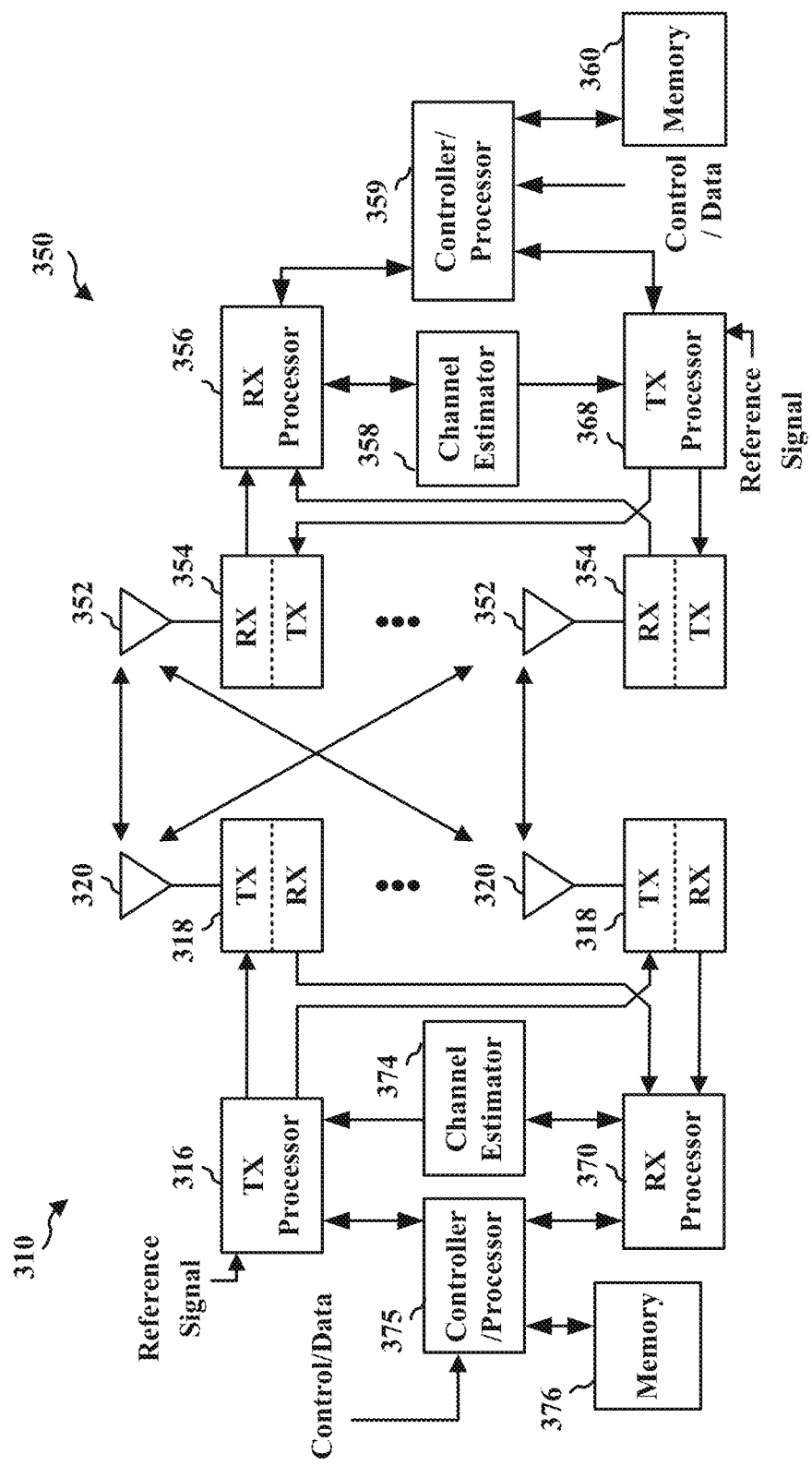
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350.

IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with SSB UE component 198 of FIG. 1.

At least one of the TX processor 316, the RX processor 370, and the controller/processor 375 may be configured to perform aspects in connection with SSB BS component 199 of FIG. 1.

The UE may search for a cell of a base station for initial access (e.g. during a RACH procedure), for cell re-selection (e.g. during a handover), or for other purposes. To derive system information to access the cell, the UE may obtain a SSB including a PSS, an SSS, and a PBCH. The UE may also measure RSRP and RSRQ from the synchronization signals for other purposes (e.g. RLM or RRM).

Figure 4:
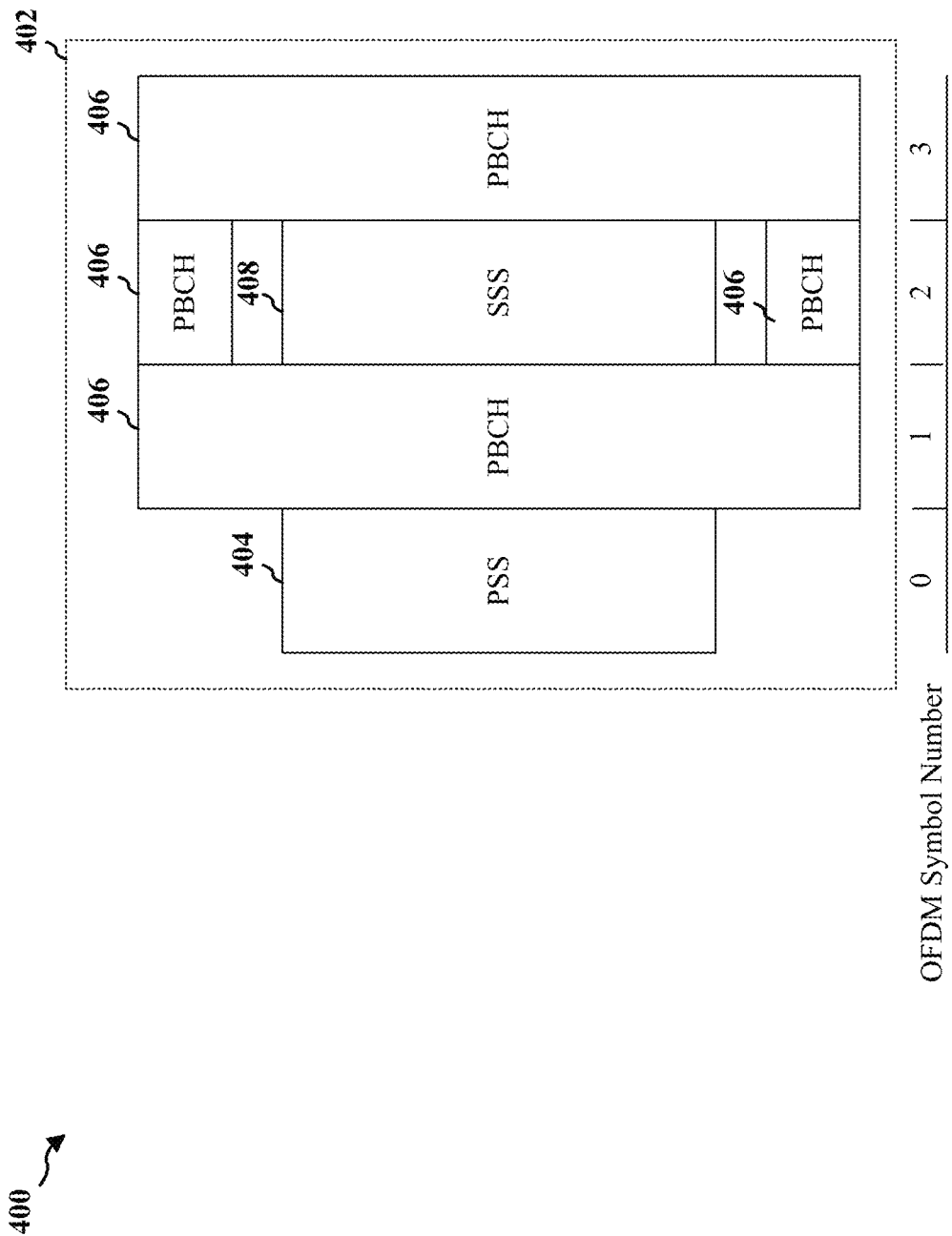
FIG. 4 is a diagram illustrating an example of an SSB.

FIG. 4 illustrates an example 400 of a SSB 402. The SSB 402 generally includes four consecutive symbols in the time domain and over 20 RBs (240 subcarriers) in the frequency domain. A first symbol of the SSB 402 includes a PSS 404, a second symbol of the SSB includes PBCH 406, a third symbol of the SSB includes SSS 408 as well as PBCH 406, and a fourth symbol of the SSB includes PBCH 406. The PBCH 406 also includes demodulation reference signals (DMRS), which location may depend upon a primary cell indicator (PCI) of the cell based on PSS and SSS.

The base station may transmit an SSB according to a configured periodicity. For example, the base station may transmit SSB periodically every 5 ms, 10 ms, 20 ms, 40 ms, 80 ms, or 160 ms. The base station may also configure an SMTC window informing the UE regarding an SSB measurement window periodicity and timing for SSB measurements. For example, the base station may configure the UE to measure SSBs periodically every 5 ms, 10 ms, 20 ms, 40 ms, 80 ms, or 160 ms. The SMTC window periodicity may be the same as the SSB periodicity. The UE may receive and measure SSBs within each SMTC window and report measurements accordingly back to the base station.

To enable beam-sweeping for PSS, SSS and PBCH, the base station may also configure an SS burst set including a set of one or more SSBs, where each SSB in the SS burst set may potentially be transmitted on a different beam (e.g. a different one of the transmit directions 182' in FIG. 1). The UE may similarly receive each SSB on a different beam (e.g. a different one of the receive directions 182" in FIG. 1). For instance, assuming an SSB periodicity of 20 ms or two 10 ms radio frames (and similarly an SMTC window periodicity of 20 ms), the base station may transmit an SSB burst set of one or more SSBs within a first-half or second-half of one of the radio frames (i.e. a 5 ms window within each 20 ms period), with each SSB being transmitted in a different beam. The base station may similarly configure the SMTC window duration to be the same as the SSB window (e.g. 5 ms). Thus, for example, the UE may receive and measure SSBs within a 5 ms window during each 20 ms period and report those measurements back to the base station.

The maximum number of candidate SSBs ($L_{max}$) within each burst set may depend on the carrier frequency of the cell. For example, for frequencies above 6 GHz, at most 64 SSBs may be transmitted within a single SS burst set. Moreover, the starting OFDM symbol index for each candidate SSB within an SS burst set may depend on the carrier frequency of the cell and the SCS. For example, for frequencies above 6 GHz, SSBs may be transmitted starting at OFDM symbols 4, 8, 16, and 20 for 120 kHz SCS and starting at OFDM symbols 8, 12, 16, 20, 32, 36, 40, and 44 for 240 kHz SCS. As each SSB generally includes four symbols, in multiple instances the SSBs may be transmitted back-to-back without gaps in between some of the SSBs.

Figure 5:
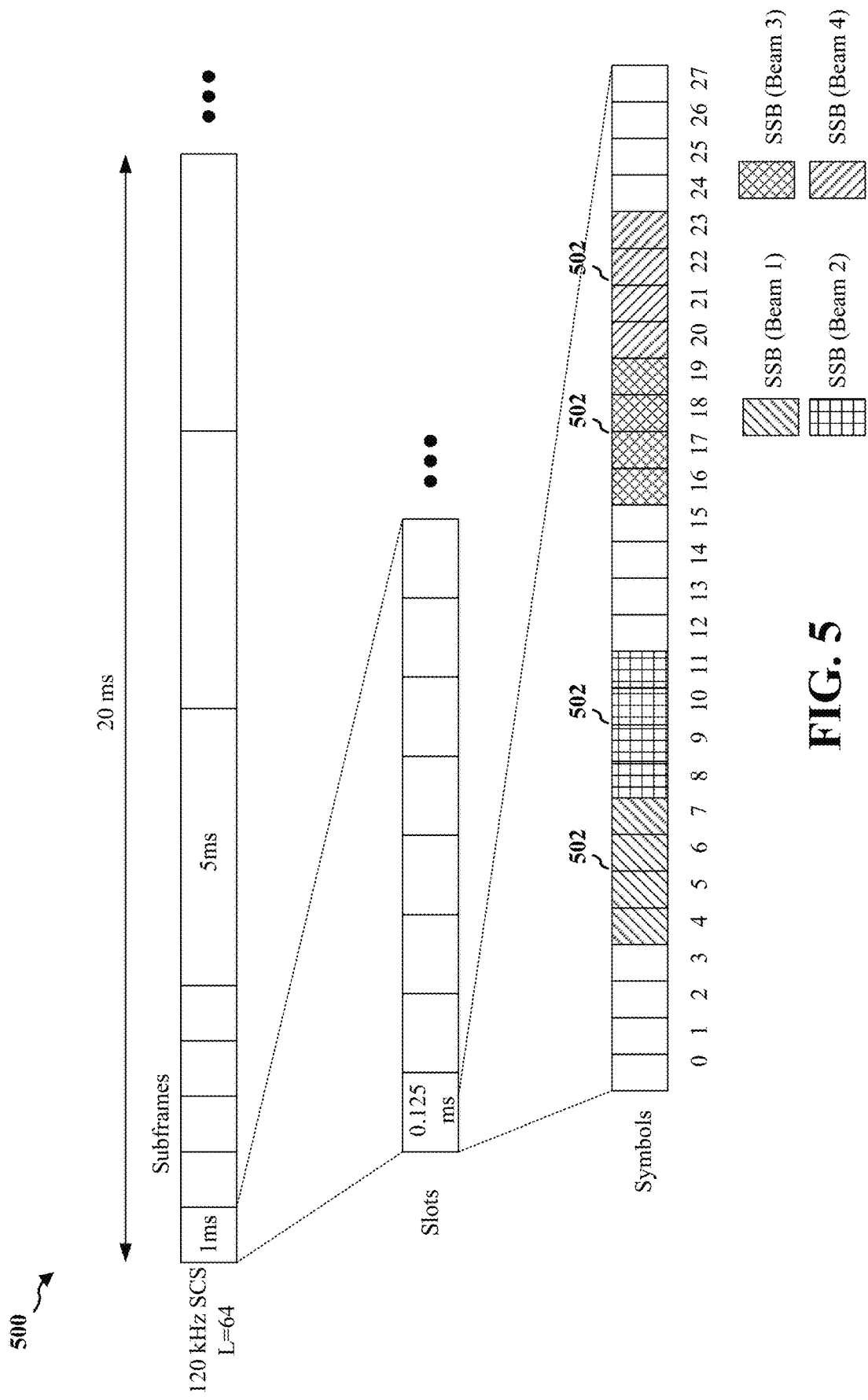
FIG. 5 is a diagram illustrating an example of SSB timing within a synchronization signal (SS) burst set.

FIG. 5 illustrates an example 500 of a timing of candidate SSBs 502 within an SS burst set having a configured SSB periodicity of 20 ms, a SCS of 120 kHz, and 64 candidate SSBs. In this example, each SSB 502 corresponds to a different beam (e.g. each SSB is transmitted in a different one of the transmit directions 182' of FIG. 1), in this case beams 1, 2, 3, and 4. Moreover, as illustrated, each 1 ms subframe at 120 kHz SCS may be divided into eight 0.125 ms slots, with each slot spanning 28 OFDM symbols. Furthermore, each SSB 502 may include four symbols (e.g. SSB 402), where the starting symbol of each SSB begins at OFDM symbols 4, 8, 16, and 20. Thus, some of the SSBs 502 may be transmitted back-to-back without any gaps in between the SSBs. For example, the SSB starting at symbol 4 may be adjacent to the SSB starting at symbol 8 without an intervening symbol separating the SSBs. Similarly, the SSB starting at symbol 16 may be adjacent to the SSB starting at symbol 20 without an intervening symbol separating the SSBs. Similar back-to-back SSB patterns may be configured in other examples at other SCS (e.g. 240 kHz).

Thus, patterns of SSBs may be configured which include at least some back-to-back SSBs, where each SSB may be transmitted and received on different beams in a given SS burst set. Depending on antenna capabilities, different base stations and UEs may switch their transmission and reception beams respectively for different SSBs within different periods of time. For example, a base station or UE that performs a beam switch instantaneously (or in less than 100 ns) may be considered a "high capability" base station or UE, while a base station or UE that requires at least 100 ns to perform a beam switch may be considered a "low capability" base station or UE. At lower numerologies (e.g. up to 120 kHz or 240 kHz SCS), the time within which the base station or UE may perform a beam switch may fall within a timing of a CP for a back-to-back SSB, irrespective of whether the base station or UE is high or low capability. However, at higher frequency bands such as 52.6 GHz-71 GHz where higher numerologies such as 960 kHz SCS may be configured, the timing of the CP may no longer be sufficient for low capability base station and UE beam switching. For instance, CP timing at 960 kHz SCS may be less than 100 ns or otherwise less than the time required for a low capability base station or a low capability UE to perform beam switching for a back-to-back SSB. Although configuring a gap (e.g. an extra symbol) between such back-to-back SSBs may allow for low capability base station or UEs to successfully perform beam switching at such higher numerologies, such gaps may be inefficient for high capability base station or UEs that can adequately perform beam switching in the first place without such gaps.

To address this inefficiency, according to a first aspect of the disclosure, the base station may configure a different SSB structure that includes more than four symbols (e.g. five symbols). For example, the base station may configure an ESSB, which includes an additional symbol in comparison to the four symbol SSB described above. The additional symbol may be the first or initial symbol of the ESSB, thus preceding the SSB. The additional symbol may be a repetition of any of the other symbols in the four symbol SSB, thereby providing a coding gain in the ESSB relative to the SSB. The base station may also configure back-to-back, ESSBs (i.e. without gaps or intervening symbols between the ESSBs) with various time domain patterns. When the base station is a high capability base station that can beam switch without a gap between back-to-back ESSBs, the base station may transmit data in the additional symbol. Similarly, when the UE is a high capability UE that can beam switch without a gap between back-to-back ESSBs, the UE may receive data in the additional symbol. Otherwise, when the base station is a low capability base station, the base station may beam switch during a portion of the time period of the additional symbol (effectively using this portion as a gap between back-to-back ESSBs), or the base station may refrain from transmitting data in the additional symbol and instead use that time period to perform beam switching (as an actual gap between back-to-back ESSBs). Similarly, when the UE is a low capability UE, the UE may beam switch during a portion of the time period of the additional symbol (again effectively using this portion as a gap between back-to-back ESSBs), or the UE may ignore data received in the additional symbol and instead use that time period to perform beam switching (again as an actual gap between back-to-back ESSBs). Thus, high capability base station and UEs may benefit from the coding gain of back-to-back five symbol ESSBs, while low capability base station and UEs may still perform beam switching to receive such ESSBs without configuring hard gaps between such ESSBs.

Alternatively, according to a second aspect of the disclosure, if the base station is a high capability base station that can beam switch without gaps between back-to-back SSBs (i.e. four symbol SSBs), the base station may configure and transmit a four symbol SSB as previously described. While high capability UEs may successfully receive such SSBs since they can beam switch without gaps between back-to-back SSBs, low capability UEs may perform one or more additional behaviors to allow for reception of such SSBs. In one example, during initial access, the low capability UE may refrain from switching between back-to-back SSBs, and instead maintain the same reception beam between different SSBs. For SSBs which are not back-to-back and are thus separated by at least one intervening symbol, the UE may perform beam switching during the gap between those SSBs. In another example, during RLM or RRM, the low capability UE may beam switch during a symbol of the SSB which includes PSS (effectively using this PSS symbol as a gap between back-to-back SSBs), or the UE may refrain from switching between back-to-back SSBs and instead maintain the same reception beam. Alternatively, the low capability UE may not measure all back-to-back SSBs in a single SMTC window (e.g. the UE may measure a first SSB but not a second, subsequent SSB, or the UE may not measure any subsequent SSB, in the SMTC window). In such case, the base station may configure longer SMTC windows to allow the UE to monitor SSBs corresponding to different beams. Thus, low capability UEs may be able to receive four symbol SSBs without configuring hard gaps between such SSBs.

Figure 6:
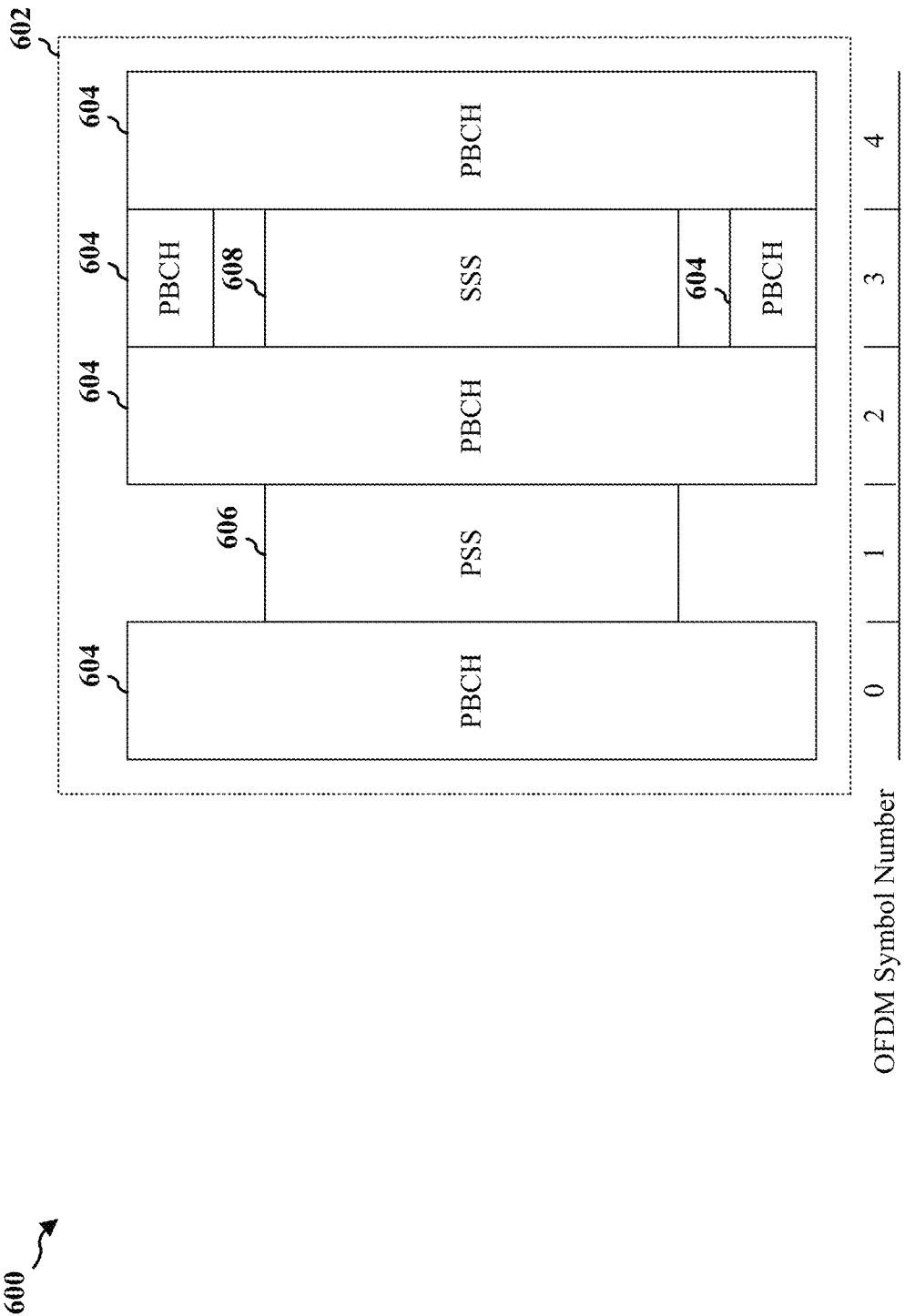
FIG. 6 is a diagram illustrating an example of an ESSB.

Now referring back to the first aspect (i.e. the ESSB) in one example, the base station may configure the ESSB such that the first or initial symbol (0) of the ESSB may include PBCH, with the remainder of the ESSB (the last four symbols) corresponding to the four symbol SSB described above. For instance, FIG. 6 illustrates an example 600 of an ESSB 602 where symbol 0 of the ESSB includes PBCH 604, symbol 1 of the ESSB includes PSS 606, symbol 2 of the ESSB includes PBCH 604, symbol 3 of the ESSB includes SSS 608 and PBCH 604, and symbol 4 of the ESSB includes PBCH 604. In such case, the added PBCH symbol 0 may be a repetition of either PBCH in symbol 2 or 4 of the ESSB 602, thereby providing PBCH coding gain for the UE, while the remaining symbols 1-4 of ESSB 602 match the corresponding symbols 0-3 of the SSB 402 in FIG. 4. In another example, the base station may configure the ESSB such that symbol 0 of the ESSB includes a PSS, where the PSS is longer than the four symbol SSB described above (e.g. the PSS maps to both symbol 0 and 1 of the ESSB). In a further example, the base station may configure symbol 0 of the ESSB to include a PSS that is a repetition of the PSS of symbol 1, but with different scrambling (e.g. a different cyclic shift). In an additional example, the base station may configure symbol 0 of the ESSB to include SSS and PBCH, where the SSS and PBCH are repeated in symbol 3.

Figure 7:
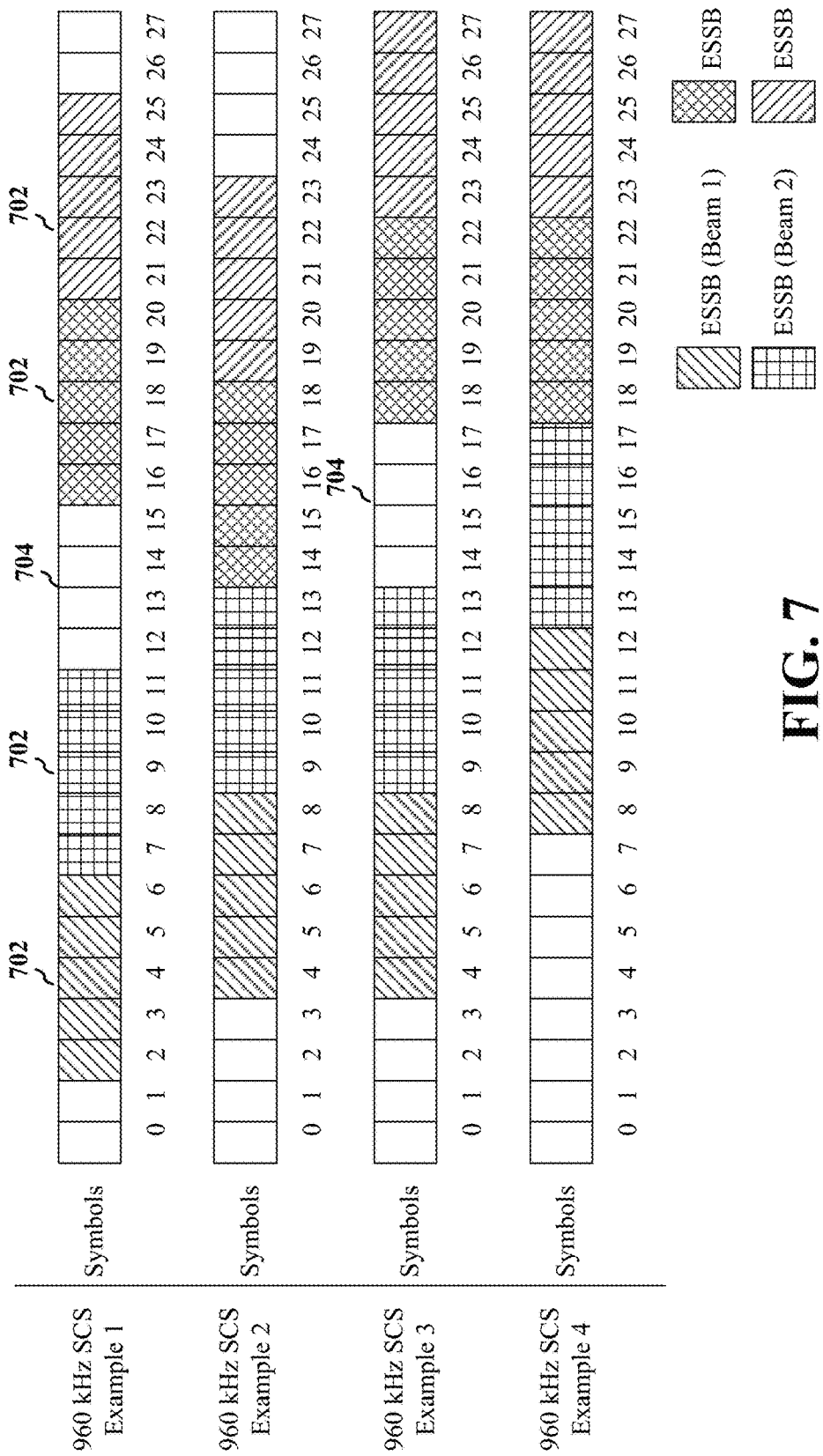
FIG. 7 is a diagram illustrating various example patterns of ESSBs corresponding to different beams.

FIG. 7 illustrates various example patterns 700 of ESSBs 702 individually corresponding to different beams (e.g. beam 1, 2, 3 and 4), where each ESSB 702 includes five symbols for 960 kHz SCS. In these examples, the base station may configure the time domain pattern of the ESSBs in a given SS burst set according to the starting symbol of each ESSB, although the base station may alternatively configure the ESSBs according to the ending symbol (or some other symbol) in other examples. For instance, as illustrated in the Figure, in one example (1), the base station may configure the starting symbols of the ESSBs to be 2, 7, 16, and 21, in another example (2), the base station may configure the starting symbols of the ESSBs to be 4, 9, 14, and 19, in a further example (3), the base station may configure the starting symbols of the ESSBs to be 4, 9, 18, and 23, and in an additional example (4), the base station may configure the starting symbols of the ESSBs to be 8, 13, 18, and 23. Thus, the base station may transmit, and the UE may receive, ESSBs including more than four symbols within a given SS burst set in any of the configured time domain patterns shown in FIG. 7 or in other configured patterns according to other examples. In these examples, each ESSB 702 may respectively correspond to ESSB 602 in FIG. 6, with the starting symbol of each ESSB (e.g. symbol 2 in the first ESSB of example 1, symbol 7 in the second ESSB of example 1, etc.) being a repetition of the second symbol of each SSB (e.g. symbol 4 in the first ESSB of example 1, symbol 9 in the second ESSB of example 1, etc.). Moreover, in some examples the ESSBs may be configured such that a gap 704 exists between certain ESSBs (e.g. examples 1 and 3), while in other examples the ESSBs may be configured without such gaps (e.g. examples 2 and 4). Additionally, the symbols not used for transmitting ESSBs may be configured for general downlink or uplink data transmissions (e.g. symbols 0, 1, 14, and 15 in example 1 may include PDCCH while symbols 12, 13, 26, and 27 in example 1 may include uplink feedback). Furthermore, while the examples shown in FIG. 7 refer to 960 kHz, other SCS greater than 240 kHz may be configured in other examples.

When the base station is a high capability base station that can beam switch without a gap between back-to-back ESSBs, the base station may transmit all five symbols of the five symbol ESSB. For instance, referring to the first example illustrated in FIG. 7, the base station may transmit in beam 1 all five symbols 2-6 of one of the ESSBs 702, switch its transmission beam to beam 2 for a subsequent one of the ESSBs 702 (without a gap between symbol 6 and symbol 7), and transmit in beam 2 all five symbols 7-11 of the subsequent one of the ESSBs. Otherwise, when the base station is a low capability base station, the base station may refrain from transmitting data in the initial symbol and instead use that time period to perform beam switching (as an actual gap between back-to-back ESSBs). For instance, referring to the first example illustrated in FIG. 7, after transmitting one of the ESSBs 702 in symbols 2-6 using beam 1, the base station may refrain from transmitting symbol 7 of a subsequent one of the ESSBs 702, and instead utilize that time to switch its transmission beam to beam 2 for transmitting the remaining symbols 8-11 of the subsequent one of the ESSBs 702. Alternatively, the low capability base station may beam switch during a portion of the time period of the initial symbol of the ESSB (effectively using this portion as a gap between back-to-back ESSBs). In other words, the base station may partially transmit data in the initial symbol of the ESSB, rather than refraining from transmitting data in the initial symbol altogether. For instance, referring to the first example illustrated in FIG. 7, if symbol 7 of the subsequent one of the ESSBs 702 spans 1000 ns in 960 kHz SCS, then the base station may perform beam switching during the first 100 ns of symbol 7 and afterwards transmit ESSB data (e.g. PBCH, PSS, or SSS) within the remaining 900 ns of symbol 7, as opposed to skipping transmission of data in symbol 7 altogether.

Similarly, when the UE is a high capability UE that can beam switch without a gap between back-to-back ESSBs, the UE may receive all five symbols of the ESSB. For instance, referring the first example illustrated in FIG. 7, the UE may receive in beam 1 all five symbols 2-6 of one of the ESSBs 702, switch its reception beam to beam 2 for a subsequent one of the ESSBs 702 (without a gap between symbol 6 and symbol 7), and receive in beam 2 all five symbols 7-11 of the subsequent one of the ESSBs. However, during initial access, the UE may not be informed of whether the base station is a high capability base station or a low capability base station. Thus, in some cases the UE may not be informed of whether the base station has fully transmitted, partially transmitted, or not transmitted data (e.g. in PBCH) in the initial symbol of an ESSB.

As a result, such high capability UEs may perform one of multiple behaviors with respect to the received ESSB. In a first option, the UE may disregard or ignore the expected initial symbol of the ESSB and effectively process the ESSB as a four symbol SSB, although the UE may fail to benefit from any coding gains in the initial symbol from SSB data repetition as a result. For instance, referring to the first example illustrated in FIG. 7, the UE may refrain from decoding symbol 2 of one of the ESSBs 702 and only decode symbols 3-7 of that ESSB to identify MIB in PBCH. In a second option, the UE may perform blind decoding of PBCH based on different hypotheses (i.e. based on one assumption that the received ESSB includes four symbols and again based on another assumption that the received ESSB includes five symbols), and the UE may determine which hypothesis is correct in response to a successful decoding of the PBCH. For instance, referring to the first example illustrated in FIG. 7, the UE may attempt to decode only symbols 3-6 of one of the ESSBs 702 to determine a first log likelihood ratio (LLR) of data in PBCH, attempt to decode symbols 2-6 of the same ESSB to determine a second LLR of data in PBCH, compare the first and second LLRs to determine which value indicates more confidence (e.g. which of the two LLRs is closer to 0 or closer to 1), and then determine whether symbol 2 (the initial symbol) was transmitted or not based on the comparison. For example, if the first LLR indicates more confidence, the UE may conclude that only a four symbol SSB was transmitted (e.g., symbol 2 of the ESSB 702 in example 1 did not include PBCH and thus was not transmitted), while if the second LLR indicates more confidence, the UE may conclude that a five symbol ESSB was transmitted (e.g., symbol 2 of the ESSB 702 in example 1 included PBCH, and thus was transmitted). In a third option, the UE may attempt to detect DMRS in PBCH within an expected initial symbol of the ESSB, in response to which the UE may determine whether the initial symbol of the ESSB was actually transmitted. For instance, referring to the first example illustrated in FIG. 7, the UE may attempt to decode DMRS in symbol 2 of one of the ESSBs 702, and if the UE successfully decodes DMRS, the UE may determine that a five symbol ESSB was transmitted and the UE may decode the ESSB accordingly; otherwise, the UE may determine that only a four symbol SSB was transmitted and the UE may decode the SSB accordingly. In a fourth option, the UE may assume the expected initial symbol of the ESSB is fully transmitted and demodulate data (e.g. PBCH, PSS, or SSS) within the symbol accordingly. For instance, referring to the first example illustrated in FIG. 7, the UE may attempt to decode symbol 2 of the one of the ESSBs 702 for a repeated PBCH without previously determining whether SSB data in the initial symbol was transmitted in the first place. In a fifth option, the UE may detect DMRS in PBCH within the four symbol SSB for channel estimation, and identify LLRs of the initial symbol to determine whether the initial symbol of the ESSB was actually or partially transmitted. For instance, referring to the first example illustrated in FIG. 7, the UE may decode DMRS in symbols 3-6 of one of the ESSBs 702, perform channel estimation (e.g. identify a channel quality indicator (CQI) or other channel state information report parameters) using the DMRS and identify a first LLR for PBCH, attempt to decode symbol 2 of the same ESSB to determine a second LLR for PBCH, combine the first and second LLRs, and determine whether symbol 2 (the initial symbol) was transmitted or not based on the combined LLRs. For example, if the combined LLRs indicate less confidence than the first LLR, the UE may conclude that only a four symbol SSB was transmitted (e.g., symbol 2 of the ESSB 702 in example 1 did not include PBCH and thus was not transmitted), while if the combined LLRs indicate more confidence, the UE may conclude that a five symbol ESSB was transmitted (e.g., symbol 2 of the ESSB 702 in example 1 included PBCH, and thus was transmitted). In contrast to the fourth option, this fifth option avoids channel estimation loss in the event data was partially transmitted in the initial symbol of the ESSB, although both options allow the UE to receive data in the initial symbol even when partially transmitted.

When the UE is a low capability UE, the UE typically takes at least a certain period of time (e.g. at least a 100 ns gap between back-to-back SSBs) to perform a beam switch. Accordingly, in one example, the UE may beam switch during a portion of the time period of the initial symbol of the ESSB (effectively using this portion as a gap between back-to-back ESSBs). For instance, referring to the first example illustrated in FIG. 7, the UE may perform beam switching from beam 1 to beam 2 at least partially within symbol 7 of one of the ESSBs 702. For example, if symbol 7 of this ESSB spans 1000 ns in 960 kHz SCS, then the UE may perform beam switching during the first 100 ns of symbol 7 and afterwards capture a majority of the samples of ESSB data (e.g. PBCH, PSS, or SSS) within the remaining 900 ns of symbol 7. In another example, the UE may refrain from beam switching between back-to-back ESSBs to benefit from the coding gain which results from the additional symbol of the ESSB relative to the SSB. For instance, referring to the first example illustrated in FIG. 7, in some cases such as initial access the UE may maintain its reception beam (e.g. beam 1) between symbols 6 and 7 of the back-to-back ESSBs, rather than switching to beam 2 as illustrated in the Figure. Additionally, in some cases the UE may not be informed of whether the base station has fully transmitted, partially transmitted, or not transmitted data (e.g. in PBCH) in the initial symbol of an ESSB. Accordingly, the low capability UE may similarly perform one of the five options described above with respect to high capability UEs, although such low capability UEs may not be able to benefit from fully transmitted initial symbols of an ESSB in contrast to high capability UEs.

In cases where the UE is in a connected mode, for example, in cases of carrier aggregation (CA), dual connectivity (DC), or inter-cell RRM, the base station may indicate whether the base station is high capability or low capability to the UE. For example, the base station may provide RRC signaling (e.g. an RRC configuration, message, or other indication) to the UE indicating a number of symbols of the ESSB (e.g. four or five symbols), a time domain pattern of the ESSB (e.g. the starting symbols of each ESSB repeating within a periodic SS burst set), or a partial transmission/reception of the initial symbol of the ESSB (e.g. a bit or other indication identifying whether data in the initial symbol will be fully or partially transmitted). This signaling may include similar information for neighbor base stations as well as serving base stations. Moreover, the indication may be transmitted in dedicated signaling (e.g. unicast) to the UE to assist the UE in performing RLM or RRM, although the indication may be alternatively or additionally broadcast or multicast to the UE in other examples. Additionally, the indication may quantify the amount of data the base station may partially transmit within the initial symbol of the ESSB when the base station performs beam switching during the initial symbol (e.g. the base station may indicate to the UE that ESSB data will be transmitted within 900 ns of a 1000 ns initial symbol for 960 kHz, or within 90% of the initial symbol).

Additionally, the base station may select an SSB pattern (e.g. a pattern of either four symbol SSBs or five symbol ESSBs) based on whether the base station is high capability or low capability. For instance, if the base station is a high capability base station, the base station may select to transmit either four symbol SSBs or five symbol ESSBs, while if the base station is a low capability base station, the base station may only transmit five symbol ESSBs. Moreover, the SSB pattern may be selected depending on whether the base station is a standalone (SA) base station or a non-standalone (NSA) base station. An SA base station refers to a base station that is directly connected to a core network (e.g. core network 190) and may receive and transmit control plane data to the UE. A non-standalone (NSA) base station refers to a base station that is connected to another base station, which in turn, is connected to a different RAT network (e.g. EPC 160) and which receives and transmits control plane data to the UE. For example, in NSA, control signaling of 5G may be anchored to a 4G base station, while in SA, a 5G base station may be directly connected to a 5G core network without depending on the 4G network for control signaling. If the base station is an SA base station, the base station may only transmit five symbol ESSBs so that UEs during initial access may assume that only one type of SSB (i.e. ESSB) may be received. If the base station is an NSA base station, the base station may select to transmit either four symbol SSBs or five symbol EESBs depending on whether the base station is high capability or low capability as described above. In such case, the different RAT base station connected to the NSA base station may also signal to the UE an indication of the selected pattern (i.e. SSBs or ESSBs).

Now referring to the second aspect of the disclosure (e.g. four symbol SSB), when the base station is a high capability base station that can beam switch without gaps between back-to-back SSBs (i.e. four symbol SSBs), the base station may configure and transmit a four symbol SSB as previously described. While high capability UEs may successfully receive such SSBs since they can beam switch without gaps between back-to-back SSBs, low capability UEs may perform one or more additional behaviors to allow for reception of such SSBs. In one example, during initial access (when the UE is detecting PSS), the low capability UE may refrain from switching between back-to-back SSBs, and instead maintain the same reception beam between different SSBs. For instance, referring to FIG. 5, after receiving one of the SSBs 502 in symbols 4-7 using beam 1, the UE may maintain the same reception beam (e.g. beam 1) for receiving a subsequent one of the SSBs 502 in symbols 8-11, rather than switching to beam 2 as illustrated. Alternatively, the UE may refrain from decoding back-to-back SSBs. For instance, referring to FIG. 5, the UE may skip decoding the subsequent one of the SSBs 502 in symbols 8-11 since that SSB is back-to-back with the SSB in symbols 4-7. For SSBs which are not back-to-back and are thus separated by at least one intervening symbol, the UE may perform beam switching during the gap between those SSBs. For instance, referring to FIG. 5, after receiving one of the SSBs 502 in symbols 8-11 using beam 2, the UE may switch to beam 3 to receive a subsequent one of the SSBs 502 in symbols 16-19, since the two SSBs are separated by a gap (e.g. symbols 12-15).

In another example, during RLM or RRM (e.g. where the UE may measure received power from SSS or DMRS in PBCH) if the UE does not use PSS for RLM/RRM measurement, the low capability UE may beam switch during a symbol of the SSB which includes PSS (effectively using this PSS symbol as a gap between back-to-back SSBs). For instance, referring to FIG. 5, after receiving one of the SSBs 502 in symbols 4-7 using beam 1, the UE may switch to beam 2 during the PSS symbol (e.g. symbol 8) of the subsequent one of the SSBs 502. Thus, the UE may not decode the PSS symbol of that SSB when the UE is not measuring the PSS.

Alternatively, if the UE uses PSS for RLM/RRM measurement, in one example, the UE may refrain from switching between back-to-back SSBs and instead maintain the same reception beam. For instance, referring to FIG. 5, after receiving one of the SSBs 502 in symbols 4-7 using beam 1, the UE may maintain the same reception beam (e.g. beam 1) for receiving a subsequent one of the SSBs 502 in symbols 8-11, rather than switching to beam 2 as illustrated. Alternatively, in another example, the low capability UE may not measure all back-to-back SSBs in a single SMTC window (e.g. the UE may measure a first SSB but not a second, subsequent SSB, or the UE may not measure any subsequent SSB, in the SMTC window). For instance, referring to FIG. 5, if the base station configures the SMTC window to be a certain period of time for SSB measurements (e.g. 5 ms), the UE may maintain the same reception beam (e.g. beam 1) for receiving subsequent ones of the SSBs 502 during that 5 ms time (e.g. in symbols 8-11, 16-19, and 20-23, and so forth), rather than switching beams prior to each SSB as illustrated, and the UE may refrain from measuring the subsequent ones of the SSBs if any of these SSBs are received in the maintained reception beam. The base station may also configure longer SMTC windows (e.g. longer than 5 ms in this example) to allow the UE to monitor SSBs corresponding to different beams. Thus, low capability UEs may be able to receive four symbol SSBs without configuring hard gaps between such SSBs.

Figure 8:
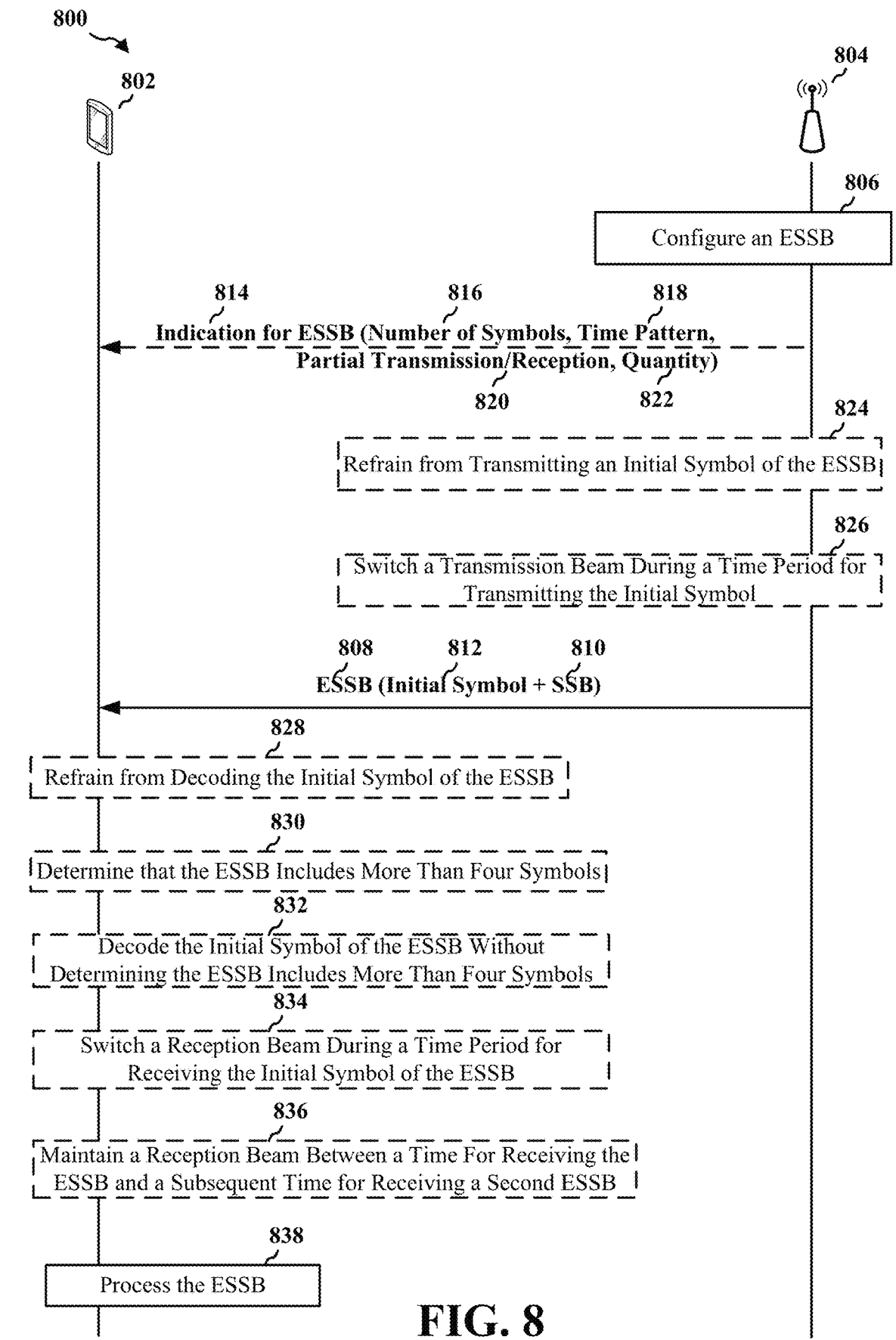
FIG. 8 is a call flow diagram between a UE and a base station.

FIG. 8 is an example 800 of a call flow between a UE 802 and a base station 804. Optional aspects are illustrated in dashed lines. At 806, the base station 804 configures an ESSB 808. The ESSB comprises a SSB 810 including four symbols and an initial symbol 812 preceding the SSB 810. For example, referring to FIGS. 4 and 6, the base station may configure an ESSB 602, which comprises a SSB including four symbols (symbols 1-4 corresponding to symbols 0-3 of SSB 402) and an additional symbol 0 occurring in time before the SSB. The initial symbol 0 may include PBCH 604 as illustrated in the example of FIG. 6, or may include PSS 606 or SSS 608 in other examples. The base station may also configure an ESSB periodicity, an SMTC window for measuring ESSBs, and a beam corresponding to each ESSB within a SS burst set including multiple ESSBs. After configuring the ESSB 808, the base station 804 may transmit the ESSB 808 (including the SSB 810 and initial symbol 812) to the UE 802 within symbols of a slot of a subframe (e.g. at 960 kHz SCS or at another SCS above 240 kHz) along with other ESSBs in a time domain pattern during periodic SS burst sets.

Additionally, the base station 804 may configure other information relating to the ESSB, and the base station may transmit an indication 814 of this information to the UE 802 prior to transmitting the ESSB 808. For instance, the base station may indicate a number of symbols 816 for the ESSB 808. For example, referring to FIG. 6, the base station may indicate that the ESSB 602 includes five symbols. The base station may also indicate a time domain pattern 818 for the ESSB 808. For example, referring to FIG. 7, the base station may indicate starting symbols corresponding to any one of the various example patterns 700 in FIG. 7 of ESSBs 702. The base station may also indicate whether a partial transmission 820 or reception of the initial symbol 812 of the ESSB 808 is to occur. For example, referring to FIG. 7, the base station may indicate to the UE that the base station will perform a beam switch partially within an initial symbol of one of the ESSBs 702. The base station may also indicate a quantity 822 associated with the partial transmission 820 or reception of the initial symbol 812. For example, referring to FIG. 7, the base station may indicate that ESSB data will be transmitted partially within the initial symbol of one of the ESSBs 702 (e.g. within 900 ns out of a 1000 ns initial symbol). The base station may transmit one or any combination of this information to the UE in indication 814 (or in multiple indications).

Moreover, when configuring the ESSB at 806, the base station 804 may select an SSB pattern (e.g. to transmit ESSB 808 without initial symbol 812, i.e. only SSB 810, or to transmit the ESSB 808 with all five symbols) based on whether the base station is high capability or low capability. For instance, if the base station is a high capability base station, the base station may select to configure and transmit ESSB 808 with or without initial symbol 812 (i.e. an ESSB of four or five symbols), while if the base station is a low capability base station, the base station may only configure and transmit ESSB 808 with initial symbol 812 (i.e. an ESSB of five symbols). Moreover, if the base station is an SA base station, the base station may only configure and transmit ESSBs with initial symbol 812 (i.e. an ESSB of five symbols). If the base station is an NSA base station, the base station may select to configure and transmit ESSB 808 with or without initial symbol 812 (i.e. an ESSB of four or five symbols) depending on whether the base station is high capability or low capability as described above. In such cases where the base station selects between ESSBs with or without the initial symbols, the base station may also signal to the UE an indication of the selected pattern (i.e. an ESSB of four or five symbols), for example, in indication 814 or in a separate indication.

At 824, the base station 804 may refrain from transmitting the initial symbol 812 of the ESSB 808. For example, when the base station is a low capability base station, the base station may refrain from transmitting data in the initial symbol and instead use that time period to perform beam switching (as an actual gap between back-to-back ESSBs). For instance, referring to the first example illustrated in FIG. 7, after transmitting one of the ESSBs 702 in symbols 2-6 using beam 1, the base station may refrain from transmitting symbol 7 of a subsequent one of the ESSBs 702, and instead utilize that time to switch its transmission beam to beam 2 for transmitting the remaining symbols 8-11 of the subsequent one of the ESSBs 702. Alternatively at 826, the base station 804 may switch a transmission beam during a time period for transmitting the initial symbol 812 of the ESSB 808. For example, the low capability base station may beam switch during a portion of the time period of the initial symbol of the ESSB (effectively using this portion as a gap between back-to-back ESSBs). In other words, the base station may partially transmit data in the initial symbol of the ESSB, rather than refraining from transmitting data in the initial symbol altogether. For instance, referring to the first example illustrated in FIG. 7, if symbol 7 of the subsequent one of the ESSBs 702 spans 1000 ns in 960 kHz SCS, then the base station may perform beam switching during the first 100 ns of symbol 7 and afterwards transmit ESSB data (e.g. PBCH, PSS, or SSS) within the remaining 900 ns of symbol 7, as opposed to skipping transmission of data in symbol 7 altogether.

At 828, the UE 802 may refrain from decoding the initial symbol 812 of the ESSB 808. For example, when the UE 802 is a high capability UE that is not informed of whether the base station 804 has fully transmitted, partially transmitted, or not transmitted data in the initial symbol 812 of ESSB 808 (e.g. if the UE does not receive indication 814, or if indication 814 does not indicate whether a partial transmission 820 of the initial symbol 812 of the ESSB 808 is to occur), the UE may disregard or ignore the expected initial symbol of the ESSB and effectively process the ESSB as a four symbol SSB according to the first behavioral option described above. For instance, referring to the first example illustrated in FIG. 7, the UE may refrain from decoding symbol 2 of one of the ESSBs 702 and only decode symbols 3-6 of that ESSB to identify MIB in PBCH. The UE may similarly perform this option if the UE is a low capability UE.

At 830, the UE 802 may determine that the ESSB 808 includes more than four symbols (e.g. that the ESSB 808 includes initial symbol 812). For example, when the UE 802 is a high capability UE that is not informed of whether the base station 804 has fully transmitted, partially transmitted, or not transmitted data in the initial symbol 812 of ESSB 808 (e.g. if the UE does not receive indication 814, or if indication 814 does not indicate the number of symbols 816 for the ESSB or similar information), the UE may determine that ESSB 808 is received (rather than only SSB 810) according to one of the second, third, or fifth behavioral options described above. In one example (i.e. the second above-described option), the UE may perform blind decoding of PBCH based on different hypotheses (i.e. based on one assumption that the received ESSB includes four symbols and again based on another assumption that the received ESSB includes five symbols), and the UE may determine which hypothesis is correct in response to a successful decoding of the PBCH. In another example (i.e. the third above-described option), the UE may attempt to detect DMRS in PBCH within an expected initial symbol of the ESSB, in response to which the UE may determine whether the initial symbol of the ESSB was actually transmitted. In a further example (i.e. the fifth above-described option), the UE may detect DMRS in PBCH within the four symbol SSB for channel estimation, and identify LLRs of the initial symbol to determine whether the initial symbol of the ESSB was actually or partially transmitted. The UE may similarly perform any of these options if the UE is a low capability UE.

At 832, the UE 802 may decode the initial symbol 812 of the ESSB 808 without determining whether the ESSB 808 includes more than four symbols. For example, when the UE 802 is a high capability UE that is not informed of whether the base station 804 has fully transmitted, partially transmitted, or not transmitted data in the initial symbol 812 of ESSB 808 (e.g. if the UE does not receive indication 814, or if indication 814 does not indicate the number of symbols 816 for the ESSB or similar information), the UE may decode initial symbol 812 according to the fourth behavioral option described above. For example, the UE may assume the expected initial symbol of the ESSB is fully transmitted and demodulate data (e.g. PBCH, PSS, or SSS) within the symbol accordingly. The UE may similarly perform this option if the UE is a low capability UE.

At 834, the UE 802 may switch a reception beam (e.g. one of the receive directions 182") during a time period for receiving the initial symbol 812 of the ESSB 808. For example, when the UE 802 is a low capability UE, the UE may beam switch during a portion of the time period of the initial symbol 812 of the ESSB 808 (effectively using this portion as a gap between back-to-back ESSBs). For instance, referring to the first example illustrated in FIG. 7, the UE may perform beam switching from beam 1 to beam 2 at least partially within symbol 7 of one of the ESSBs 702. For example, if symbol 7 of this ESSB spans 1000 ns in 960 kHz SCS, then the UE may perform beam switching during the first 100 ns of symbol 7 and afterwards capture a majority of the samples of ESSB data (e.g. PBCH, PSS, or SSS) within the remaining 900 ns of symbol 7. Alternatively, at 836, the UE 802 may maintain a reception beam (e.g. one of the receive directions 182") between a time for receiving the ESSB 808 and a subsequent time for receiving a subsequent ESSB. For example, when the UE 802 is a low capability UE, the UE may refrain from beam switching between back-to-back ESSBs. For instance, referring to the first example illustrated in FIG. 7, in some cases such as initial access the UE may maintain its reception beam (e.g. beam 1) between symbols 6 and 7 of the back-to-back ESSBs, rather than switching to beam 2 as illustrated in the Figure.

Finally, at 838, the UE 802 may process the ESSB 808. For example, referring to FIG. 6, the UE may decode ESSB 602 and detect PSS 606 and SSS 608 and MIB in PBCH 604, and the UE may obtain initial access to the base station 804 (e.g. perform a RACH procedure) based on the detected information. The UE may also perform RLM/RRM measurements, handovers, channel estimation, or other procedures using the PSS 606, SSS 608, DMRS in PBCH 604, or other data in the ESSB 602.

Figure 9:
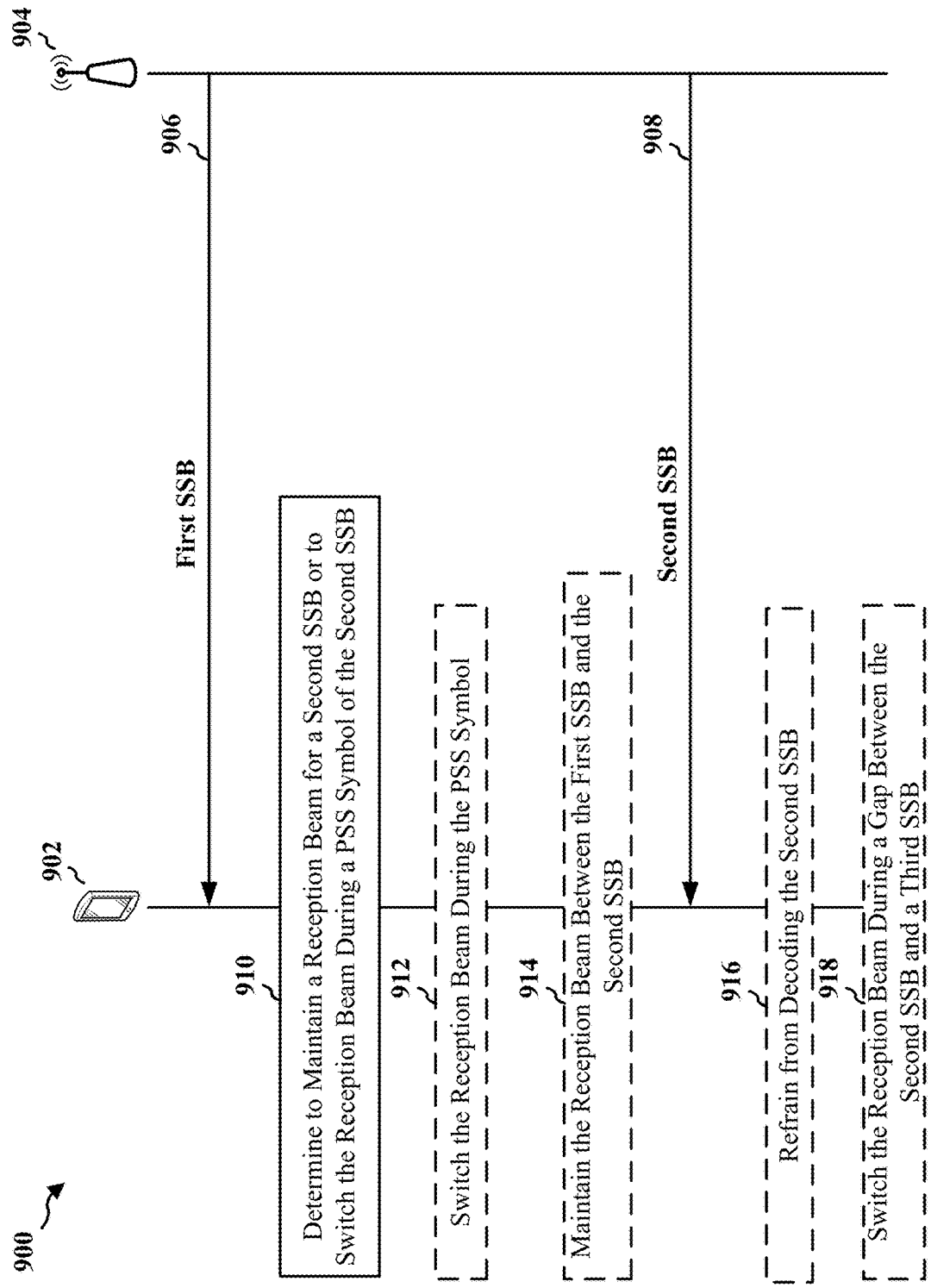
FIG. 9 is a call flow diagram between a UE and a base station.

FIG. 9 is another example 900 of a call flow between a UE 902 and a base station 904. Optional aspects are illustrated in dashed lines. The UE 902 receives a first SSB 906 using a reception beam (e.g. in one of the receive directions 182"). For example, referring to FIG. 5, the UE may receive one of the SSBs 502 in symbols 4-7 using beam 1. The UE also receives a second SSB 908 subsequent to the first SSB 906. For example, referring to FIG. 5, the UE may receive a subsequent one of the SSBs 502 in symbols 8-11.

At 910, the UE determines to maintain the reception beam for the second SSB 908 or to switch the reception beam during a PSS symbol of the second SSB 908. For example, if the UE is a low capability UE, the UE may refrain from switching between back-to-back SSBs (e.g. the one of the SSBs 502 in symbols 4-7 and the subsequent one of the SSBs 502 in symbols 8-11 in FIG. 5), and instead maintain the same reception beam between different SSBs (e.g. receive both SSBs 502 using beam 1). In another example, the UE may perform beam switching during a gap between SSBs (e.g. during symbols 12-15 between the subsequent one of the SSBs 502 and a third one of the SSBs 502 in symbols 16-19), or during a symbol of the SSB which includes PSS (e.g. during symbol 8 in the subsequent one of the SSBs 502, which may include PSS 404). Additional details are described below with respect to 912, 914, 916, and 918 for such low capability UEs.

In one example, at 912, the UE may switch the reception beam during the PSS symbol. For instance, during RLM or RRM (e.g. where the UE may measure received power from SSS or DMRS in PBCH) if the UE does not use PSS for RLM/RRM measurement, the low capability UE may beam switch during a symbol of the SSB which includes PSS (effectively using this PSS symbol as a gap between back-to-back SSBs). For instance, referring to FIG. 5, after receiving one of the SSBs 502 in symbols 4-7 using beam 1, the UE may switch to beam 2 during the PSS symbol (e.g. symbol 8) of the subsequent one of the SSBs 502. Thus, the UE may not decode the PSS symbol of that SSB when the UE is not measuring the PSS.

In another example, at 914, the UE may maintain the reception beam between the first SSB 906 and the second SSB 908. For instance, if the UE uses PSS for RLM/RRM measurement, in one example, the UE may refrain from switching between back-to-back SSBs and instead maintain the same reception beam. For instance, referring to FIG. 5, after receiving one of the SSBs 502 in symbols 4-7 using beam 1, the UE may maintain the same reception beam (e.g. beam 1) for receiving a subsequent one of the SSBs 502 in symbols 8-11, rather than switching to beam 2 as illustrated.

In another example, at 916, the UE may refrain from decoding the second SSB 908. For instance, during initial access, the UE may refrain from decoding back-to-back SSBs. For example, referring to FIG. 5, the UE may skip decoding the subsequent one of the SSBs 502 in symbols 8-11 since that SSB is back-to-back with the SSB in symbols 4-7. The UE may also refrain from decoding the second SSB during a SMTC window. For instance, the low capability UE may not measure all back-to-back SSBs (e.g. subsequent SSBs) in a single SMTC window. Moreover, referring to FIG. 5, if the base station configures the SMTC window to be a certain period of time for SSB measurements (e.g. 5 ms), the UE may maintain the same reception beam (e.g. beam 1) for receiving subsequent ones of the SSBs 502 during that 5 ms time (e.g. in symbols 8-11, 16-19, and 20-23, and so forth), rather than switching beams prior to each SSB as illustrated.

In an additional example, at 918, the UE may switch the reception beam during a gap between the second SSB and a third SSB. For instance, for SSBs which are not back-to-back and are thus separated by at least one intervening symbol, the UE may perform beam switching during the gap between those SSBs. For instance, referring to FIG. 5, after receiving the subsequent one of the SSBs 502 in symbols 8-11 using beam 2, the UE may switch to beam 3 to receive an additional one of the SSBs 502 in symbols 16-19, since the two SSBs are separated by a gap (e.g. symbols 12-15).

While various features or examples have been described in association with specific aspects (e.g., a first aspect relating to ESSBs in FIG. 8 and a second aspect relating to four symbol SSBs in FIG. 9), these features or examples are not limited to their respective aspects. Moreover, any of the above-described features, examples or aspects may be combined or used together with any other aforementioned feature, example or aspect. For instance, a UE or base station may perform any of the steps described above with respect to FIG. 8 in combination with any of the steps described above with respect to FIG. 9. Thus, any of the features, examples or aspects described above may be combined to form additional features, examples or aspects without departing from the scope of the present disclosure.

Figure 10:
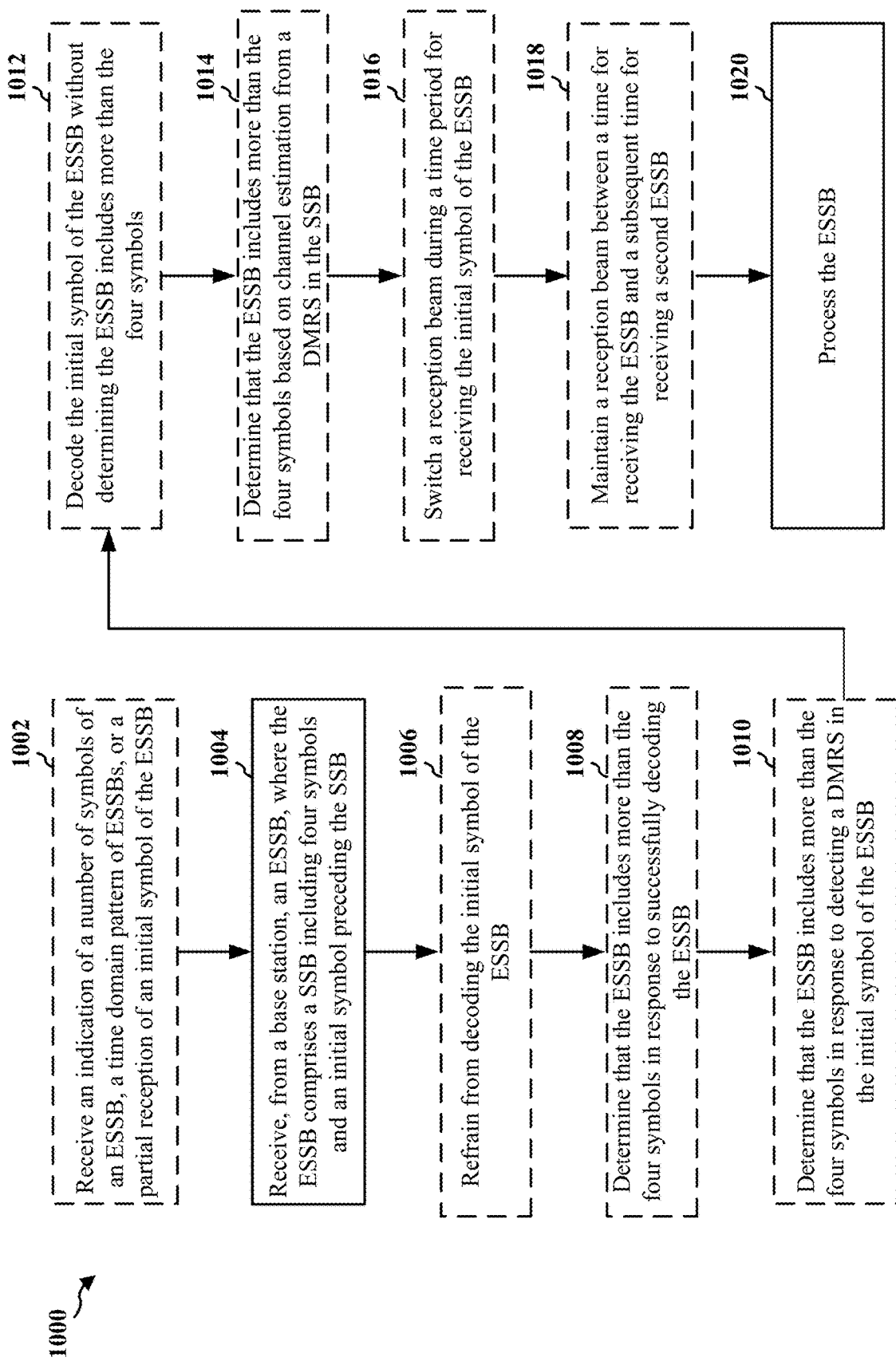
FIG. 10 is a flowchart of a method of wireless communication at a UE.

FIG. 10 is a flowchart 1000 of a method of wireless communication. The method may be performed by a UE (e.g., the UE 104, 350, 802, 902; the apparatus 1302) in communication with a base station. Optional aspects are illustrated in dashed lines. The method allows for high capability UEs to benefit from the coding gain of back-to-back five symbol ESSBs, while also allowing for low capability UEs to perform beam switching to receive such ESSBs without configuring hard gaps between the ESSBs.

At 1002, the UE may receive an indication of a number of the symbols of the ESSB, a time domain pattern of ESSBs, or a partial reception of the initial symbol of the ESSB. For example, 1002 may be performed by indication component 1340. For instance, referring to FIG. 8, the UE 802 may receive indication 814 of the number of symbols 816 of ESSB 808, the time domain pattern 818 of ESSBs, or whether the partial transmission 820 of ESSB data in initial symbol 812 is to occur. The indication may be for the base station (e.g. relating to ESSBs from base station 804) or another base station (e.g. relating to ESSBs from a neighbor base station). The indication may be received in dedicated signaling (e.g. unicast). The indication may include a quantity (e.g. quantity 822) associated with the partial reception of the initial symbol of the ESSB.

The UE may also receive, at 1002, an SSB indication that the ESSB includes more than four symbols when the base station is a NSA base station. Alternatively, the base station may be a SA base station. For instance, referring to FIG. 8, the indication 814 (or a separate indication) may indicate that ESSB 808 includes more than four symbols (e.g. initial symbol 812 and SSB 810) when base station 804 is a NSA base station. Alternatively, base station 804 may be a SA base station.

At 1004, the UE receives, from the base station, an ESSB, where the ESSB comprises a SSB including four symbols and an initial symbol preceding the SSB. For example, 1004 may be performed by ESSB component 1342. For instance, referring to FIG. 8, the UE 802 may receive ESSB 808 including SSB 810 and initial symbol 812 preceding the SSB. The initial symbol may include a PBCH (e.g. PBCH 604 as illustrated in the example of FIG. 6), a PSS (e.g. PSS 606), or a SSS (e.g. SSS 608). The initial symbol may be a repetition of one of the symbols of the SSB (e.g. a repetition of PBCH, PSS, or SSS in SSB 402, 810). A final symbol of the ESSB may be adjacent to an initial symbol of a second ESSB (e.g. the ESSBs are back-to-back). For instance, as shown in the first example of FIG. 7, final symbol 6 of one of the ESSBs 702 for beam 1 may be adjacent to initial symbol 7 of another of the ESSBs 702 for beam 2. The ESSB may be received in a pattern associated with a subcarrier spacing greater than 240 kHz (e.g. 960 kHz SCS).

At 1006, the UE may refrain from decoding the initial symbol of the ESSB. For example, 1006 may be performed by decode component 1344. For instance, referring to FIG. 8, at 828, the UE 802 may refrain from decoding initial symbol 812 of ESSB 808 according to the first behavioral option described above (e.g. effectively processing the ESSB as a four symbol SSB).

At 1008, the UE may determine that the ESSB includes more than the four symbols in response to successfully decoding the ESSB. For example, 1008 may be performed by determination component 1346. For instance, referring to FIG. 8, at 830, the UE 802 may determine that the ESSB 808 includes more than four symbols (e.g. that the ESSB 808 includes initial symbol 812) according to the second behavioral option described above (e.g. based on blind decoding of PBCH based on different hypotheses).

At 1010, the UE may determine that the ESSB includes more than the four symbols in response to detecting a DMRS in the initial symbol of the ESSB. For example, 1010 may be performed by the determination component 1346. For instance, referring to FIG. 8, at 830, the UE 802 may determine that the ESSB 808 includes more than four symbols (e.g. that the ESSB 808 includes initial symbol 812) according to the third behavioral option described above (e.g. based on detection of DMRS in PBCH within the initial symbol of the ESSB).

At 1012, the UE may decode the initial symbol of the ESSB without determining the ESSB includes more than the four symbols. For example, 1012 may be performed by the decode component 1344. For instance, referring to FIG. 8, at 832, the UE 802 may decode the initial symbol 812 of the ESSB 808 without determining whether the ESSB 808 includes more than four symbols according to the fourth behavioral option described above (e.g. based on an assumption that data in the initial symbol of the ESSB has been fully transmitted).

At 1014, the UE may determine that that the ESSB includes more than the four symbols based on channel estimation from a DMRS in the SSB. For example, 1014 may be performed by the determination component 1346. For instance, referring to FIG. 8, at 830, the UE 802 may determine that the ESSB 808 includes more than four symbols (e.g. that the ESSB 808 includes initial symbol 812) according to the fifth behavioral option described above (e.g. based on detection of DMRS in PBCH within the SSB 810 for channel estimation).

At 1016, the UE may switch a reception beam during a time period for receiving the initial symbol of the ESSB. For example, 1016 may be performed by beam component 1348. For instance, referring to FIG. 8, at 834, the UE 802 may switch a reception beam (e.g. one of the receive directions 182") during a time period for receiving the initial symbol 812 of the ESSB 808.

At 1018, the UE may maintain a reception beam between a time for receiving the ESSB and a subsequent time for receiving a second ESSB. For example, 1018 may be performed by the beam component 1348. For instance, referring to FIG. 8, at 836, the UE 802 may maintain a reception beam (e.g. one of the receive directions 182") between a time for receiving the ESSB 808 and a subsequent time for receiving a subsequent ESSB.

Finally, at 1020, the UE processes the ESSB. For example, 1020 may be performed by process component 1350. For instance, referring to FIG. 8, at 838, the UE 802 may process the ESSB 808.

Figure 11:
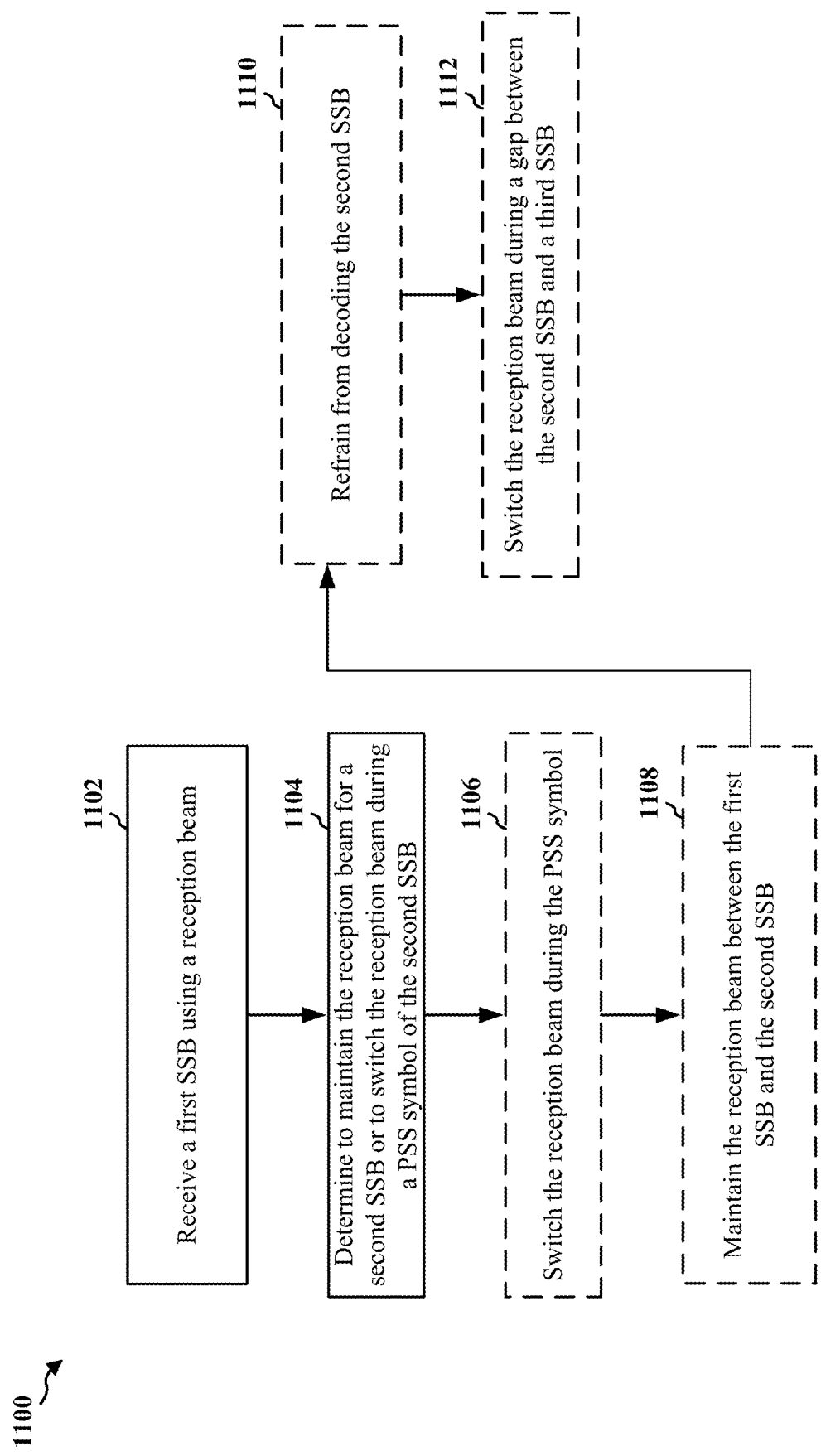
FIG. 11 is a flowchart of another method of wireless communication at a UE.

FIG. 11 is a flowchart 1100 of a method of wireless communication. The method may be performed by a UE (e.g., the UE 104, 350, 802, 902; the apparatus 1302) in communication with a base station. Optional aspects are illustrated in dashed lines. The method allows for low capability UEs to be able to receive four symbol SSBs without configuring hard gaps between such SSBs.

At 1102, the UE receives a first SSB using a reception beam. For example, 1102 may be performed by SSB component 1352. For instance, referring to FIG. 9, the UE 902 may receive a first SSB 906 using a reception beam (e.g. in one of the receive directions 182").

At 1104, the UE determines to maintain the reception beam for a second SSB or to switch the reception beam during a PSS symbol of the second SSB. For example, 1104 may be performed by the determination component 1346. For instance, referring to FIG. 9, at 910, the UE 902 may determine to maintain the reception beam for the second SSB 908 or to switch the reception beam during a PSS symbol of the second SSB 908.

At 1106, the UE may switch the reception beam during the PSS symbol. For example, 1106 may be performed by the beam component 1348. For instance, referring to FIG. 9, at 912, the UE 902 may switch the reception beam during the PSS symbol.

At 1108, the UE may maintain the reception beam between the first SSB and the second SSB. For example, 1108 may be performed by the beam component 1348. For instance, referring to FIG. 9, at 914, the UE 902 may maintain the reception beam between the first SSB 906 and the second SSB 908.

At 1110, the UE may refrain from decoding the second SSB. For example, 1110 may be performed by the decode component 1344. For instance, referring to FIG. 9, at 916, the UE 902 may refrain from decoding the second SSB 908. The UE may also refrain from decoding, at 1110, the second SSB during a SMTC window (e.g. at 916 in FIG. 9).

Finally, at 1112, the UE may switch the reception beam during a gap between the second SSB and a third SSB. For example, 1112 may be performed by the beam component 1348. For instance, referring to FIG. 9, at 918, the UE 902 may switch the reception beam during a gap between the second SSB 908 and a third SSB.

Figure 12:
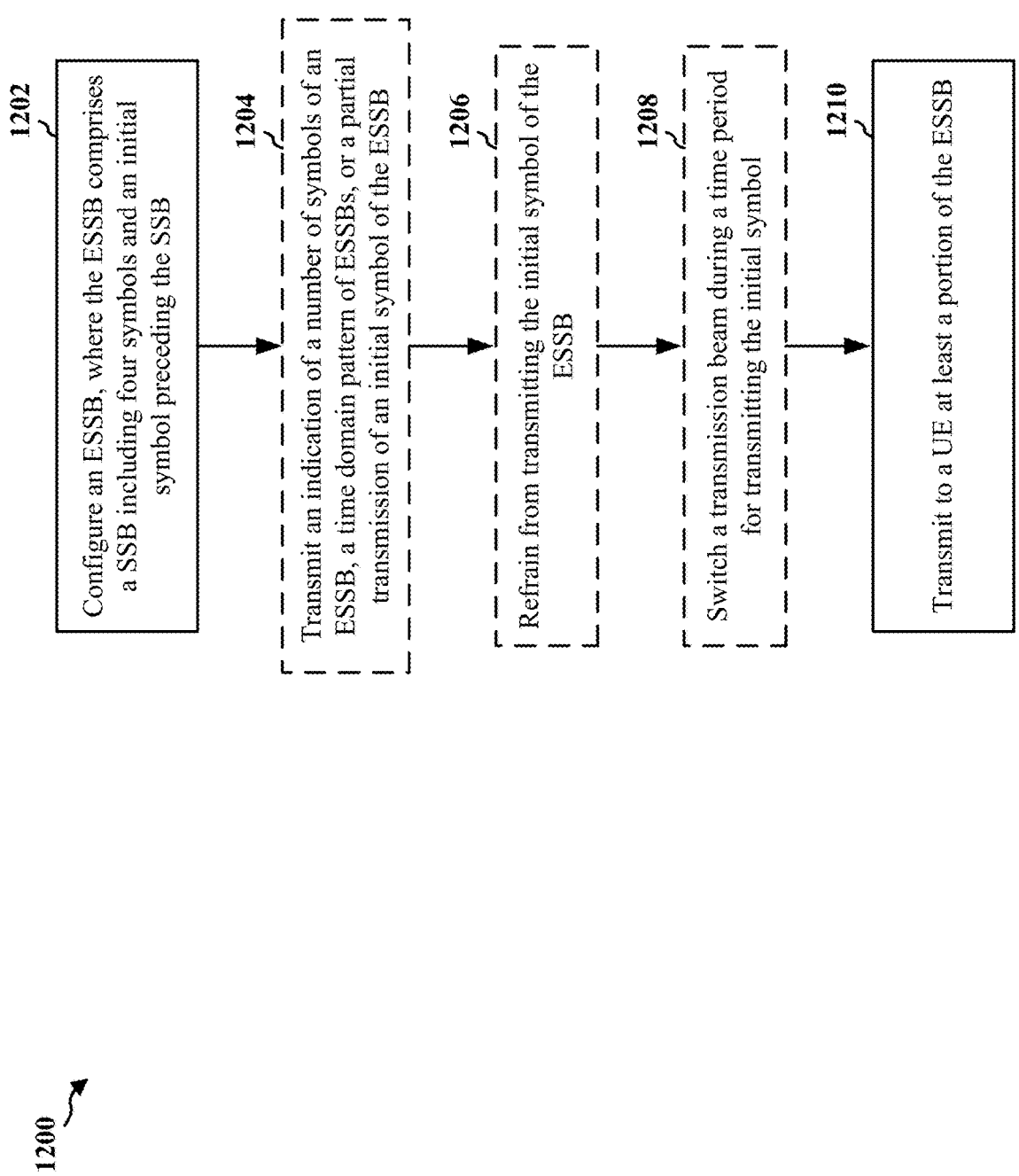
FIG. 12 is a flowchart of a method of wireless communication at a base station.

FIG. 12 is a flowchart 1200 of a method of wireless communication. The method may be performed by a base station (e.g., the base station 102/180, 310, 804, 904; the apparatus 1402). Optional aspects are illustrated in dashed lines. The method allows for high capability base stations to benefit from the coding gain of back-to-back five symbol ESSBs, while also allowing for low capability base stations to perform beam switching to transmit such ESSBs without configuring hard gaps between the ESSBs.

At 1202, the base station configures an ESSB, where the ESSB comprises a SSB including four symbols and an initial symbol preceding the SSB. For example, 1202 may be performed by configuration component 1440. For instance, referring to FIG. 8, at 806, the base station 804 configures an ESSB 808 including SSB 810 and initial symbol 812 preceding the SSB. The initial symbol may include a PBCH (e.g. PBCH 604 as illustrated in the example of FIG. 6), a PSS (e.g. PSS 606), or a SSS (e.g. SSS 608). The initial symbol may be a repetition of one of the symbols of the SSB (e.g. a repetition of PBCH, PSS, or SSS in SSB 402, 810).

A final symbol of the ESSB may be adjacent to an initial symbol of a second ESSB (e.g. the ESSBs are back-to-back). For instance, as shown in the first example of FIG. 7, final symbol 6 of one of the ESSBs 702 for beam 1 may be adjacent to initial symbol 7 of another of the ESSBs 702 for beam 2. The ESSB may be transmitted in a pattern associated with a subcarrier spacing greater than 240 kHz (e.g. 960 kHz SCS).

At 1204, the base station may transmit an indication of a number of the symbols of the ESSB, a time domain pattern of ESSBs, or a partial transmission of the initial symbol of the ESSB. For example, 1204 may be performed by indication component 1442. For instance, referring to FIG. 8, the base station 804 may transmit the indication 814 of the number of symbols 816 of ESSB 808, the time domain pattern 818 of ESSBs, or whether the partial transmission 820 of ESSB data in initial symbol 812 is to occur. The indication may be for the base station (e.g. relating to ESSBs from base station 804) or another base station (e.g. relating to ESSBs from a neighbor base station). The indication may be transmitted in dedicated signaling (e.g. unicast). The indication may include a quantity (e.g. quantity 822) associated with the partial transmission of the initial symbol of the ESSB.

The base station may also transmit, at 1204, an SSB indication that the ESSB includes more than four symbols when the base station is a NSA base station. Alternatively, the base station may be a SA base station. For instance, referring to FIG. 8, the indication 814 (or a separate indication) may indicate that ESSB 808 includes more than four symbols (e.g. initial symbol 812 and SSB 810) when base station 804 is a NSA base station. Alternatively, base station 804 may be a SA base station.

At 1206, the base station may refrain from transmitting the initial symbol of the ESSB. For example, 1206 may be performed by symbol component 1444. For instance, referring to FIG. 8, at 824, the base station 804 may refrain from transmitting the initial symbol 812 of the ESSB 808.

At 1208, the base station may switch a transmission beam during a time period for transmitting the initial symbol. For example, 1208 may be performed by beam component 1446. For instance, referring to FIG. 8, at 824, when the base station 804 refrains from transmitting the initial symbol 812 of the ESSB 808, the base station may instead use that time period to perform beam switching.

The base station may also switch a transmission beam, at 1208, during a time period for transmitting the initial symbol of the ESSB, where the ESSB may be transmitted during a portion of the time period after the switching. For instance, referring to FIG. 8, at 826, the base station 804 may switch a transmission beam during a time period for transmitting the initial symbol 812 of the ESSB 808.

Finally, at 1210, the base station transmits to a UE at least a portion of the ESSB. For example, 1210 may be performed by ESSB component 1448. For instance, referring to FIG. 8, the base station 804 may transmit ESSB 808 including SSB 810 and initial symbol 812 preceding the SSB. Alternatively, the base station may transmit ESSB 808 without the initial symbol 812 (e.g. with only SSB 810), or ESSB 808 with data partially transmitted in initial symbol 812.

Figure 13:
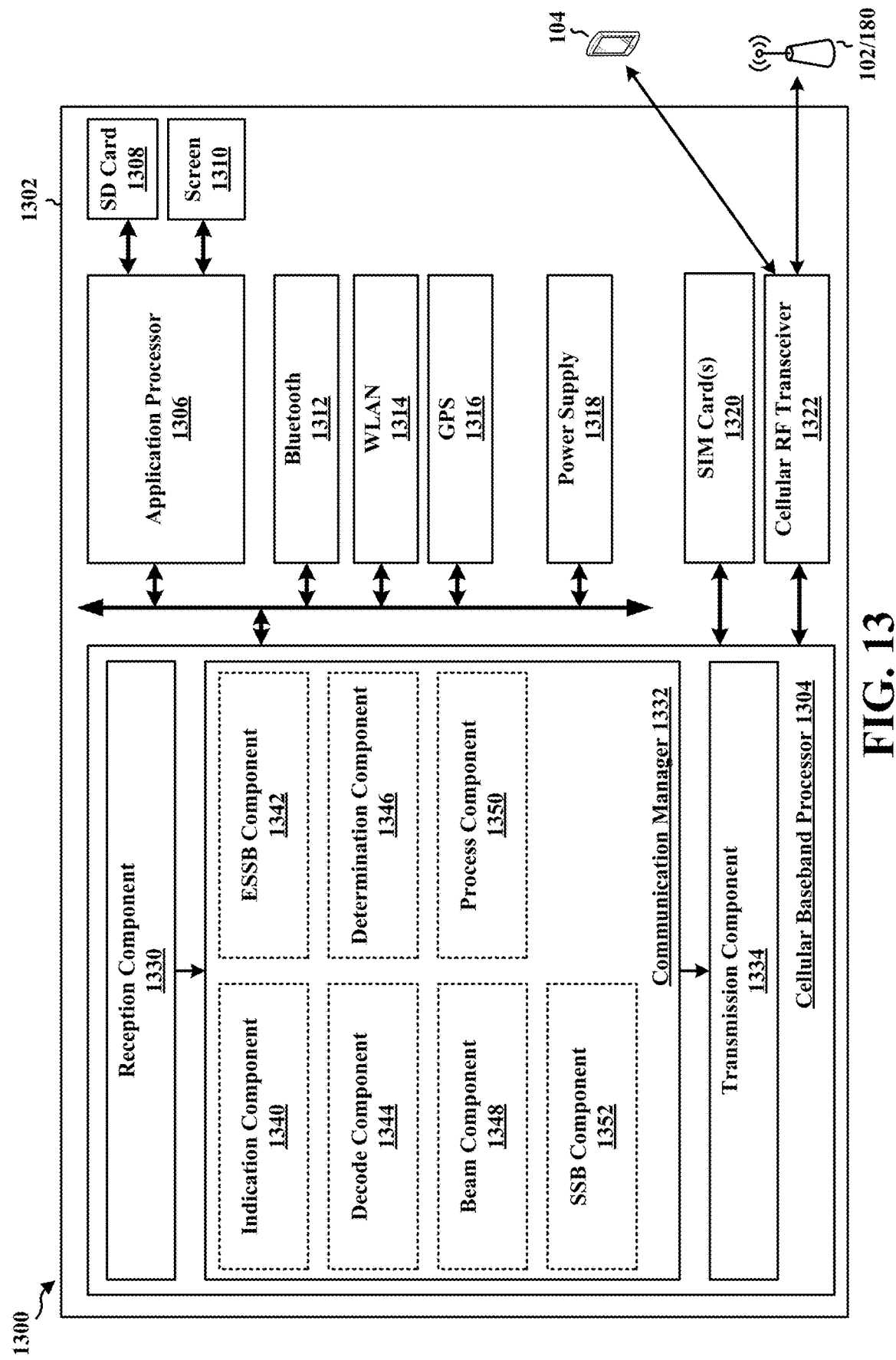
FIG. 13 is a diagram illustrating an example of a hardware implementation for an example apparatus.

FIG. 13 is a diagram 1300 illustrating an example of a hardware implementation for an apparatus 1302. The apparatus 1302 is a UE and includes a cellular baseband processor 1304 (also referred to as a modem) coupled to a cellular RF transceiver 1322 and one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, and a power supply 1318. The cellular baseband processor 1304 communicates through the cellular RF transceiver 1322 with the UE 104 and/or BS 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the UE 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., see 350 of FIG. 3) and include the aforediscussed additional modules of the apparatus 1302.

The communication manager 1332 includes an indication component 1340 that is configured to receive an indication of a number of the symbols of the ESSB, a time domain pattern of ESSBs, or a partial reception of the initial symbol of the ESSB, or to receive an SSB indication that the ESSB includes more than the four symbols when the base station is a non-standalone (NSA) base station, e.g., as described in connection with 1002. The communication manager 1332 further includes an ESSB component 1342 that is configured to receive, from a base station, an extended synchronization signal block (ESSB), wherein the ESSB comprises a synchronization signal block (SSB) including four symbols and an initial symbol preceding the SSB, e.g., as described in connection with 1004. The communication manager 1332 further includes a decode component 1344 that receives input in the form of the ESSB from the ESSB component 1342 and is configured to refrain from decoding the initial symbol of the ESSB, e.g., as described in connection with 1006, or to decode the initial symbol of the ESSB without determining the ESSB includes more than the four symbols, e.g., as described in connection with 1012. The communication manager 1332 further includes a determination component 1346 that receives input in the form of the ESSB from the ESSB component 1342 and is configured to determine that the ESSB includes more than the four symbols in response to successfully decoding the ESSB, e.g., as described in connection with 1008, to determine that the ESSB includes more than the four symbols in response to detecting a demodulation reference signal (DMRS) in the initial symbol of the ESSB, e.g., as described in connection with 1010, or to determine that the ESSB includes more than the four symbols based on channel estimation from a demodulation reference signal (DMRS) in the SSB, e.g., as described in connection with 1014. The communication manager 1332 further includes a beam component 1348 that receives input in the form of the ESSB from the ESSB component 1342 and is configured to switch a reception beam during a time period for receiving the initial symbol of the ESSB, e.g., as described in connection with 1016, or to maintain a reception beam between a time for receiving the ESSB and a subsequent time for receiving a second ESSB, e.g., as described in connection with 1018. The communication manager 1332 further includes a process component 1350 that receives input in the form of the ESSB from the ESSB component 1342 and is configured to process the ESSB, e.g., as described in connection with 1020.

The communication manager 1332 further includes an SSB component 1352 that is configured to receive a first synchronization signal block (SSB) using a reception beam, e.g., as described in connection with 1102. The determination component 1346 receives input in the form of the first SSB from the SSB component 1352 and is further configured to determine to maintain the reception beam for a second SSB or to switch the reception beam during a primary synchronization signal (PSS) symbol of the second SSB, e.g., as described in connection with 1104. The beam component 1348 receives input in the form of the first SSB from the SSB component 1352 and is further configured to switch the reception beam during the PSS symbol, e.g., as described in connection with 1106, to maintain the reception beam between the first SSB and the second SSB, e.g., as described in connection with 1108, or to switch the reception beam during a gap between the second SSB and a third SSB, e.g., as described in connection with 1112. The decode component 1344 is further configured to refrain from decoding the second SSB, or to refrain from decoding the second SSB during a SSB-based radio resource management (RRM) Measurement Timing Configuration (SMTC) window, e.g., as described in connection with 1110.

The apparatus may include additional components that perform each of the blocks of the algorithm in the aforementioned flowcharts of FIGS. 10 and 11. As such, each block in the aforementioned flowcharts of FIGS. 10 and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the cellular baseband processor 1304, includes means for receiving, from a base station, an extended synchronization signal block (ESSB), wherein the ESSB comprises a synchronization signal block (SSB) including four symbols and an initial symbol preceding the SSB; and means for processing the ESSB. In one configuration, the apparatus 1302, and in particular the cellular baseband processor 1304, may include means for refraining from decoding the initial symbol of the ESSB. In one configuration, the apparatus 1302, and in particular the cellular baseband processor 1304, may include means for determining that the ESSB includes more than the four symbols in response to successfully decoding the ESSB. In one configuration, the apparatus 1302, and in particular the cellular baseband processor 1304, may include means for determining that the ESSB includes more than the four symbols in response to detecting a demodulation reference signal (DMRS) in the initial symbol of the ESSB. In one configuration, the apparatus 1302, and in particular the cellular baseband processor 1304, may include means for decoding the initial symbol of the ESSB without determining the ESSB includes more than the four symbols. In one configuration, the apparatus 1302, and in particular the cellular baseband processor 1304, may include means for determining that the ESSB includes more than the four symbols based on channel estimation from a demodulation reference signal (DMRS) in the SSB. In one configuration, the apparatus 1302, and in particular the cellular baseband processor 1304, may include means for switching a reception beam during a time period for receiving the initial symbol of the ESSB. In one configuration, the apparatus 1302, and in particular the cellular baseband processor 1304, may include means for maintaining a reception beam between a time for receiving the ESSB and a subsequent time for receiving a second ESSB. In one configuration, the apparatus 1302, and in particular the cellular baseband processor 1304, may include means for receiving an indication of a number of the symbols of the ESSB, a time domain pattern of ESSBs, or a partial reception of the initial symbol of the ESSB. In one configuration, the apparatus 1302, and in particular the cellular baseband processor 1304, may include means for receiving an SSB indication that the ESSB includes more than the four symbols when the base station is a non-standalone (NSA) base station.

Alternatively, in one configuration, the apparatus 1302, and in particular the cellular baseband processor 1304, includes means for receiving a first synchronization signal block (SSB) using a reception beam; and means for determining to maintain the reception beam for a second SSB or to switch the reception beam during a primary synchronization signal (PSS) symbol of the second SSB. In one configuration, the apparatus 1302, and in particular the cellular baseband processor 1304, may include means for refraining from decoding the second SSB. In one configuration, the apparatus 1302, and in particular the cellular baseband processor 1304, may include means for switching the reception beam during a gap between the second SSB and a third SSB. In one configuration, the apparatus 1302, and in particular the cellular baseband processor 1304, may include means for switching the reception beam during the PSS symbol. In one configuration, the apparatus 1302, and in particular the cellular baseband processor 1304, may include means for maintaining the reception beam between the first SSB and the second SSB. In one configuration, the apparatus 1302, and in particular the cellular baseband processor 1304, may include means for refraining from decoding the second SSB during a SSB-based radio resource management (RRM) Measurement Timing Configuration (SMTC) window.

The aforementioned means may be one or more of the aforementioned components of the apparatus 1302 configured to perform the functions recited by the aforementioned means. As described supra, the apparatus 1302 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 14:
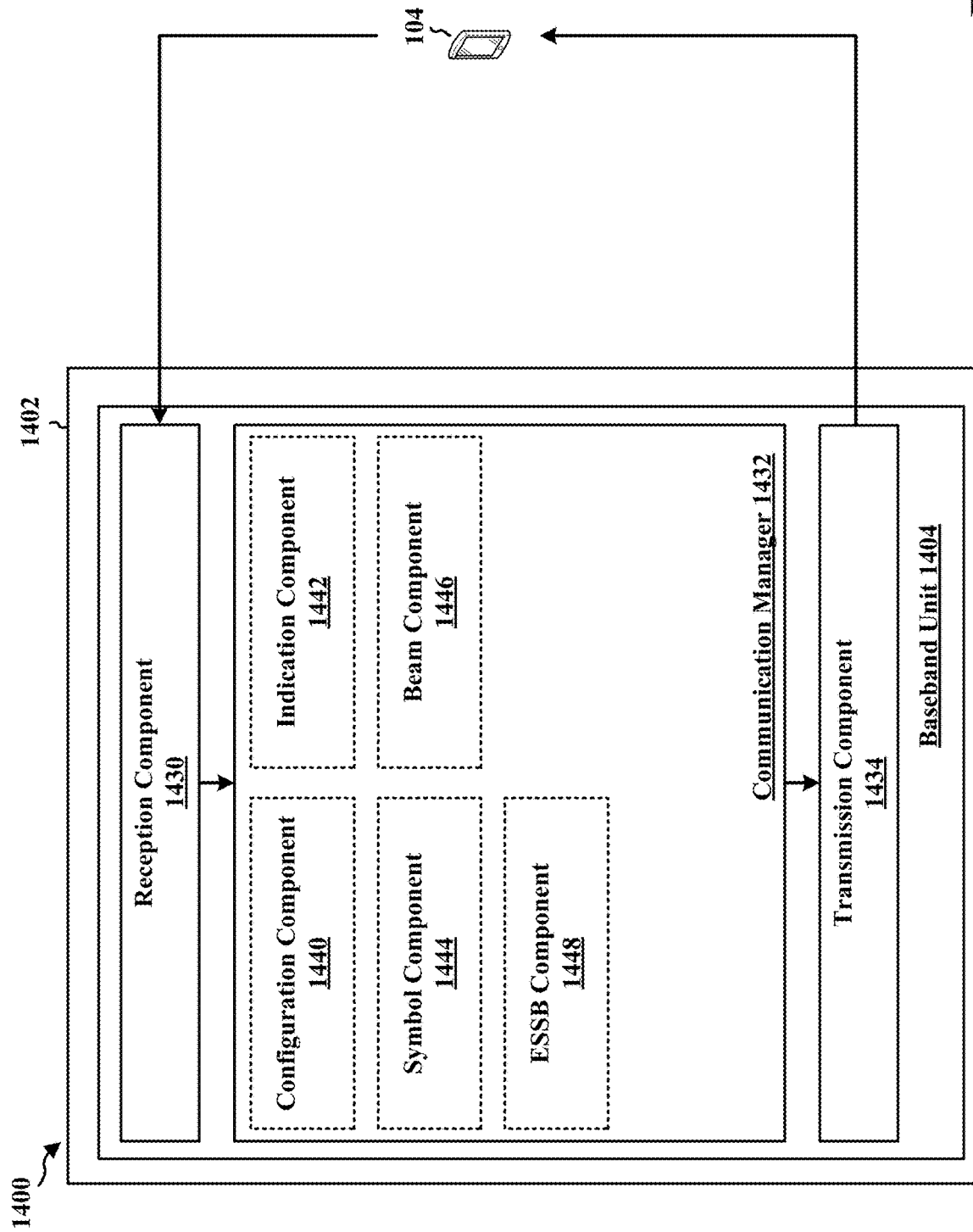
FIG. 14 is a diagram illustrating another example of a hardware implementation for another example apparatus.

FIG. 14 is a diagram 1400 illustrating an example of a hardware implementation for an apparatus 1402. The apparatus 1402 is a BS and includes a baseband unit 1404. The baseband unit 1404 may communicate through a cellular RF transceiver with the UE 104. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404. The baseband unit 1404 may be a component of the BS 310 and may include the memory 376 and/or at least one of the TX processor 316, the RX processor 370, and the controller/processor 375.

The communication manager 1432 includes a configuration component 1440 that configures an extended synchronization signal block (ESSB), wherein the ESSB comprises a synchronization signal block (SSB) including four symbols and an initial symbol preceding the SSB, e.g., as described in connection with 1202. The communication manager 1432 further includes an indication component 1442 that transmits an indication of a number of the symbols of the ESSB, a time domain pattern of ESSBs, or a partial transmission of the initial symbol of the ESSB, or that transmits an SSB indication that the ESSB includes more than four symbols when the base station is a non-standalone (NSA) base station, e.g., as described in connection with 1204. The communication manager 1432 further includes a symbol component 1444 that refrains from transmitting the initial symbol of the ESSB, e.g., as described in connection with 1206. The communication manager 1432 further includes a beam component 1446 that switches a transmission beam during a time period for transmitting the initial symbol, or that switches a transmission beam during a time period for transmitting the initial symbol of the ESSB, wherein the ESSB is transmitted during a portion of the time period after the switching, e.g., as described in connection with 1208. The communication manager 1432 further includes an ESSB component 1448 that transmits to a user equipment (UE) at least a portion of the ESSB, e.g., as described in connection with 1210.

The apparatus may include additional components that perform each of the blocks of the algorithm in the aforementioned flowchart of FIG. 12. As such, each block in the aforementioned flowchart of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the baseband unit 1404, includes means for configuring an extended synchronization signal block (ESSB), wherein the ESSB comprises a synchronization signal block (SSB) including four symbols and an initial symbol preceding the SSB; and means for transmitting to a user equipment (UE) at least a portion of the ESSB. In one configuration, the apparatus 1402, and in particular the baseband unit 1404, may include means for refraining from transmitting the initial symbol of the ESSB; and means for switching a transmission beam during a time period for transmitting the initial symbol. In one configuration, the apparatus 1402, and in particular the baseband unit 1404, may include means for switching a transmission beam during a time period for transmitting the initial symbol of the ESSB, wherein the ESSB is transmitted during a portion of the time period after the switching. In one configuration, the apparatus 1402, and in particular the baseband unit 1404, may include means for transmitting an indication of a number of the symbols of the ESSB, a time domain pattern of ESSBs, or a partial transmission of the initial symbol of the ESSB. In one configuration, the apparatus 1402, and in particular the baseband unit 1404, may include means for transmitting an SSB indication that the ESSB includes more than four symbols when the base station is a non-standalone (NSA) base station.

The aforementioned means may be one or more of the aforementioned components of the apparatus 1402 configured to perform the functions recited by the aforementioned means. As described supra, the apparatus 1402 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Example 1 is a method of wireless communication at a user equipment (UE), comprising: receiving, from a base station, an extended synchronization signal block (ESSB), wherein the ESSB comprises a synchronization signal block (SSB) including four symbols and an initial symbol preceding the SSB; and processing the ESSB.

Example 2 is the method of Example 1, wherein the initial symbol includes a physical broadcast channel (PBCH), a primary synchronization signal (PSS), or a secondary synchronization signal (SSS).

Example 3 is the method of any of Examples 1 and 2, wherein the initial symbol is a repetition of one of the symbols of the SSB.

Example 4 is the method of any of Examples 1 to 3, wherein a final symbol of the ESSB is adjacent to an initial symbol of a second ESSB.

Example 5 is the method of any of Examples 1 to 4, wherein the ESSB is received in a pattern associated with a subcarrier spacing greater than 240 kHz.

Example 6 is the method of any of Examples 1 to 5, further comprising refraining from decoding the initial symbol of the ESSB.

Example 7 is the method of any of Examples 1 to 5, further comprising determining that the ESSB includes more than the four symbols in response to successfully decoding the ESSB.

Example 8 is the method of any of Examples 1 to 5, further comprising determining that the ESSB includes more than the four symbols in response to detecting a demodulation reference signal (DMRS) in the initial symbol of the ESSB.

Example 9 is the method of any of Examples 1 to 5, further comprising decoding the initial symbol of the ESSB without determining the ESSB includes more than the four symbols.

Example 10 is the method of any of Examples 1 to 5, further comprising determining that the ESSB includes more than the four symbols based on channel estimation from a demodulation reference signal (DMRS) in the SSB.

Example 11 is the method of any of Examples 1 to 10, further comprising switching a reception beam during a time period for receiving the initial symbol of the ESSB.

Example 12 is the method of any of Examples 1 to 10, further comprising maintaining a reception beam between a time for receiving the ESSB and a subsequent time for receiving a second ESSB.

Example 13 is the method of any of Examples 1 to 12, further comprising receiving an indication of a number of the symbols of the ESSB, a time domain pattern of ESSBs, or a partial reception of the initial symbol of the ESSB.

Example 14 is the method of Example 13, wherein the indication is for the base station or another base station.

Example 15 is the method of Example 13 or 14, wherein the indication is received in dedicated signaling.

Example 16 is the method of any of Examples 13 to 15, wherein the indication includes a quantity associated with the partial reception of the initial symbol of the ESSB.

Example 17 is the method of any of Examples 1 to 16, wherein the base station is a standalone (SA) base station.

Example 18 is the method of any of Examples 1 to 16, further comprising receiving an SSB indication that the ESSB includes more than the four symbols when the base station is a non-standalone (NSA) base station.

Example 19 is an apparatus for wireless communication, comprising: a processor; memory coupled with the processor; and instructions stored in the memory and operable, when executed by the processor, to cause the apparatus to: receive, from a base station, an extended synchronization signal block (ESSB), wherein the ESSB comprises a synchronization signal block (SSB) including four symbols and an initial symbol preceding the SSB; and process the ESSB.

Example 20 is the apparatus of Example 19, wherein the initial symbol includes a physical broadcast channel (PBCH), a primary synchronization signal (PSS), or a secondary synchronization signal (SSS).

Example 21 is the apparatus of Example 19 or 20, wherein the initial symbol is a repetition of one of the symbols of the SSB.

Example 22 is the apparatus of any of Examples 19 to 21, wherein a final symbol of the ESSB is adjacent to an initial symbol of a second ESSB.

Example 23 is the apparatus of any of Examples 19 to 22, wherein the ESSB is received in a pattern associated with a subcarrier spacing greater than 240 kHz.

Example 24 is the apparatus of any of Examples 19 to 23, wherein the instructions, when executed by the processor, further cause the apparatus to refrain from decoding the initial symbol of the ESSB.

Example 25 is the apparatus of any of Examples 19 to 23, wherein the instructions, when executed by the processor, further cause the apparatus to determine that the ESSB includes more than the four symbols in response to successfully decoding the ESSB.

Example 26 is the apparatus of any of Examples 19 to 23, wherein the instructions, when executed by the processor, further cause the apparatus to determine that the ESSB includes more than the four symbols in response to detecting a demodulation reference signal (DMRS) in the initial symbol of the ESSB.

Example 27 is the apparatus of any of Examples 19 to 23, wherein the instructions, when executed by the processor, further cause the apparatus to decode the initial symbol of the ESSB without determining the ESSB includes more than the four symbols.

Example 28 is the apparatus of any of Examples 19 to 23, wherein the instructions, when executed by the processor, further cause the apparatus to determine that the ESSB includes more than the four symbols based on channel estimation from a demodulation reference signal (DMRS) in the SSB.

Example 29 is the apparatus of any of Examples 19 to 28, wherein the instructions, when executed by the processor, further cause the apparatus to switch a reception beam during a time period for receiving the initial symbol of the ESSB.

Example 30 is the apparatus of any of Examples 19 to 28, wherein the instructions, when executed by the processor, further cause the apparatus to maintain a reception beam between a time for receiving the ESSB and a subsequent time for receiving a second ESSB.

Example 31 is the apparatus of any of Examples 19 to 30, wherein the instructions, when executed by the processor, further cause the apparatus to receive an indication of a number of the symbols of the ESSB, a time domain pattern of ESSBs, or a partial reception of the initial symbol of the ESSB.

Example 32 is the apparatus of Example 31, wherein the indication is for the base station or another base station.

Example 33 is the apparatus of Example 31 or 32, wherein the indication is received in dedicated signaling.

Example 34 is the apparatus of any of Examples 31 to 33, wherein the indication includes a quantity associated with the partial reception of the initial symbol of the ESSB.

Example 35 is the apparatus of any of Examples 19 to 34, wherein the base station is a standalone (SA) base station.

Example 36 is the apparatus of any of Examples 19 to 34, wherein the instructions, when executed by the processor, further cause the apparatus to receive an SSB indication that the ESSB includes more than the four symbols when the base station is a non-standalone (NSA) base station.

Example 37 is an apparatus for wireless communication, comprising: means for receiving, from a base station, an extended synchronization signal block (ESSB), wherein the ESSB comprises a synchronization signal block (SSB) including four symbols and an initial symbol preceding the SSB; and means for processing the ESSB.

Example 38 is the apparatus of Example 37, wherein the initial symbol includes a physical broadcast channel (PBCH), a primary synchronization signal (PSS), or a secondary synchronization signal (SSS).

Example 39 is the apparatus of Example 37 or 38, wherein the initial symbol is a repetition of one of the symbols of the SSB.

Example 40 is the apparatus of any of Examples 37 to 39, wherein a final symbol of the ESSB is adjacent to an initial symbol of a second ESSB.

Example 41 is the apparatus of any of Examples 37 to 40, wherein the ESSB is received in a pattern associated with a subcarrier spacing greater than 240 kHz.

Example 42 is the apparatus of any of Examples 37 to 41, further comprising means for refraining from decoding the initial symbol of the ESSB.

Example 43 is the apparatus of any of Examples 37 to 41, further comprising means for determining that the ESSB includes more than the four symbols in response to successfully decoding the ESSB.

Example 44 is the apparatus of any of Examples 37 to 41, further comprising means for determining that the ESSB includes more than the four symbols in response to detecting a demodulation reference signal (DMRS) in the initial symbol of the ESSB.

Example 45 is the apparatus of any of Examples 37 to 41, further comprising means for decoding the initial symbol of the ESSB without determining the ESSB includes more than the four symbols.

Example 46 is the apparatus of any of Examples 37 to 41, further comprising means for determining that the ESSB includes more than the four symbols based on channel estimation from a demodulation reference signal (DMRS) in the SSB.

Example 47 is the apparatus of any of Examples 37 to 46, further comprising means for switching a reception beam during a time period for receiving the initial symbol of the ESSB.

Example 48 is the apparatus of any of Examples 37 to 46, further comprising means for maintaining a reception beam between a time for receiving the ESSB and a subsequent time for receiving a second ESSB.

Example 49 is the apparatus of any of Examples 37 to 48, further comprising means for receiving an indication of a number of the symbols of the ESSB, a time domain pattern of ESSBs, or a partial reception of the initial symbol of the ESSB.

Example 50 is the apparatus of Example 49, wherein the indication is for the base station or another base station.

Example 51 is the apparatus of Example 49 or 50, wherein the indication is received in dedicated signaling.

Example 52 is the apparatus of any of Examples 49 to 51, wherein the indication includes a quantity associated with the partial reception of the initial symbol of the ESSB.

Example 53 is the apparatus of any of Examples 37 to 52, wherein the base station is a standalone (SA) base station.

Example 54 is the apparatus of any of Examples 37 to 52, further comprising means for receiving an SSB indication that the ESSB includes more than the four symbols when the base station is a non-standalone (NSA) base station.

Example 55 is a computer-readable medium storing computer executable code, the code when executed by a processor cause the processor to: receive, from a base station, an extended synchronization signal block (ESSB), wherein the ESSB comprises a synchronization signal block (SSB) including four symbols and an initial symbol preceding the SSB; and process the ESSB.

Example 56 is a method of wireless communication at a user equipment (UE), comprising: receiving a first synchronization signal block (SSB) using a reception beam; and determining to maintain the reception beam for a second SSB or to switch the reception beam during a primary synchronization signal (PSS) symbol of the second SSB.

Example 57 is the method of Example 56, further comprising refraining from decoding the second SSB.

Example 58 is the method of Examples 56 or 57, further comprising switching the reception beam during a gap between the second SSB and a third SSB.

Example 59 is the method of any of Examples 56 to 58, further comprising switching the reception beam during the PSS symbol.

Example 60 is the method of any of Examples 56 to 58, further comprising maintaining the reception beam between the first SSB and the second SSB.

Example 61 is the method of any of Examples 56 to 60, further comprising refraining from decoding the second SSB during a SSB-based radio resource management (RRM) Measurement Timing Configuration (SMTC) window.

Example 62 is an apparatus for wireless communication, comprising: a processor; memory coupled with the processor; and instructions stored in the memory and operable, when executed by the processor, to cause the apparatus to: receive a first synchronization signal block (SSB) using a reception beam; and determine to maintain the reception beam for a second SSB or to switch the reception beam during a primary synchronization signal (PSS) symbol of the second SSB.

Example 63 is the apparatus of Example 62, wherein the instructions, when executed by the processor, further cause the apparatus to refrain from decoding the second SSB.

Example 64 is the apparatus of Example 62 or 63, wherein the instructions, when executed by the processor, further cause the apparatus to switch the reception beam during a gap between the second SSB and a third SSB.

Example 65 is the apparatus of any of Examples 62 to 64, wherein the instructions, when executed by the processor, further cause the apparatus to switch the reception beam during the PSS symbol.

Example 66 is the apparatus of any of Examples 62 to 64, wherein the instructions, when executed by the processor, further cause the apparatus to maintain the reception beam between the first SSB and the second SSB.

Example 67 is the apparatus of any of Examples 62 to 66, wherein the instructions, when executed by the processor, further cause the apparatus to refrain from decoding the second SSB during a SSB-based radio resource management (RRM) Measurement Timing Configuration (SMTC) window.

Example 68 is an apparatus for wireless communication, comprising: means for receiving a first synchronization signal block (SSB) using a reception beam; and means for determining to maintain the reception beam for a second SSB or to switch the reception beam during a primary synchronization signal (PSS) symbol of the second SSB.

Example 69 is the apparatus of Example 68, further comprising means for refraining from decoding the second SSB.

Example 70 is the apparatus of Example 68 or 69, further comprising means for switching the reception beam during a gap between the second SSB and a third SSB.

Example 71 is the apparatus of any of Examples 68 to 70, further comprising means for switching the reception beam during the PSS symbol.

Example 72 is the apparatus of any of Examples 68 to 70, further comprising means for maintaining the reception beam between the first SSB and the second SSB.

Example 73 is the apparatus of any of Examples 68 to 72, further comprising means for refraining from decoding the second SSB during a SSB-based radio resource management (RRM) Measurement Timing Configuration (SMTC) window.

Example 74 is a computer-readable medium storing computer executable code, the code when executed by a processor cause the processor to: receive a first synchronization signal block (SSB) using a reception beam; and determine to maintain the reception beam for a second SSB or to switch the reception beam during a primary synchronization signal (PSS) symbol of the second SSB.

Example 75 is a method of wireless communication at a base station, comprising: configuring an extended synchronization signal block (ESSB), wherein the ESSB comprises a synchronization signal block (SSB) including four symbols and an initial symbol preceding the SSB; and transmitting to a user equipment (UE) at least a portion of the ESSB.

Example 76 is the method of Example 75, wherein the initial symbol includes a physical broadcast channel (PBCH), a primary synchronization signal (PSS), or a secondary synchronization signal (SSS).

Example 77 is the method of Example 75 or 76, wherein the initial symbol is a repetition of one of the symbols of the SSB.

Example 78 is the method of any of Examples 75 to 77, wherein a final symbol of the ESSB is adjacent to an initial symbol of a second ESSB.

Example 79 is the method of any of Examples 75 to 78, wherein the ESSB is transmitted in a pattern associated with a subcarrier spacing greater than 240 kHz.

Example 80 is the method of any of Examples 75 to 79, further comprising: refraining from transmitting the initial symbol of the ESSB; and switching a transmission beam during a time period for transmitting the initial symbol.

Example 81 is the method of any of Examples 75 to 79, further comprising switching a transmission beam during a time period for transmitting the initial symbol of the ESSB, wherein the ESSB is transmitted during a portion of the time period after the switching.

Example 82 is the method of any of Examples 75 to 81, further comprising transmitting an indication of a number of the symbols of the ESSB, a time domain pattern of ESSBs, or a partial transmission of the initial symbol of the ESSB.

Example 83 is the method of Example 82, wherein the indication is for the base station or another base station.

Example 84 is the method of Example 82 or 83, wherein the indication is transmitted in dedicated signaling.

Example 85 is the method of any of Examples 82 to 84, wherein the indication includes a quantity associated with the partial transmission of the initial symbol of the ESSB.

Example 86 is the method of any of Examples 75 to 85, wherein the base station is a standalone (SA) base station.

Example 87 is the method of any of Examples 75 to 85, further comprising transmitting an SSB indication that the ESSB includes more than four symbols when the base station is a non-standalone (NSA) base station.

Example 88 is an apparatus for wireless communication, comprising: a processor; memory coupled with the processor; and instructions stored in the memory and operable, when executed by the processor, to cause the apparatus to: configure an extended synchronization signal block (ESSB), wherein the ESSB comprises a synchronization signal block (SSB) including four symbols and an initial symbol preceding the SSB; and transmit to a user equipment (UE) at least a portion of the ESSB.

Example 89 is the apparatus of Example 88, wherein the initial symbol includes a physical broadcast channel (PBCH), a primary synchronization signal (PSS), or a secondary synchronization signal (SSS).

Example 90 is the apparatus of Example 88 or 89, wherein the initial symbol is a repetition of one of the symbols of the SSB.

Example 91 is the apparatus of any of Examples 88 to 90, wherein a final symbol of the ESSB is adjacent to an initial symbol of a second ESSB.

Example 92 is the apparatus of any of Examples 88 to 91, wherein the ESSB is transmitted in a pattern associated with a subcarrier spacing greater than 240 kHz.

Example 93 is the apparatus of any of Examples 88 to 92, wherein the instructions, when executed by the processor, further cause the apparatus to: refrain from transmitting the initial symbol of the ESSB; and switch a transmission beam during a time period for transmitting the initial symbol.

Example 94 is the apparatus of any of Examples 88 to 92, wherein the instructions, when executed by the processor, further cause the apparatus to switch a transmission beam during a time period for transmitting the initial symbol of the ESSB, wherein the ESSB is transmitted during a portion of the time period after the switching.

Example 95 is the apparatus of any of Examples 88 to 94, wherein the instructions, when executed by the processor, further cause the apparatus to transmit an indication of a number of the symbols of the ESSB, a time domain pattern of ESSBs, or a partial transmission of the initial symbol of the ESSB.

Example 96 is the apparatus of Example 95, wherein the indication is for the apparatus or another base station.

Example 97 is the apparatus of Examples 95 or 96, wherein the indication is transmitted in dedicated signaling.

Example 98 is the apparatus of any of Examples 95 to 97, wherein the indication includes a quantity associated with the partial transmission of the initial symbol of the ESSB.

Example 99 is the apparatus of any of Examples 88 to 98, wherein the apparatus is a standalone (SA) base station.

Example 100 is the apparatus of any of Examples 88 to 98, wherein the instructions, when executed by the processor, further cause the apparatus to transmit an SSB indication that the ESSB includes more than four symbols when the apparatus is a non-standalone (NSA) base station.

Example 101 is an apparatus for wireless communication, comprising: means for configuring an extended synchronization signal block (ESSB), wherein the ESSB comprises a synchronization signal block (SSB) including four symbols and an initial symbol preceding the SSB; and means for transmitting to a user equipment (UE) at least a portion of the ESSB.

Example 102 is the apparatus of Example 101, wherein the initial symbol includes a physical broadcast channel (PBCH), a primary synchronization signal (PSS), or a secondary synchronization signal (SSS).

Example 103 is the apparatus of Example 101 or 102, wherein the initial symbol is a repetition of one of the symbols of the SSB.

Example 104 is the apparatus of any of Examples 101 to 103, wherein a final symbol of the ESSB is adjacent to an initial symbol of a second ESSB.

Example 105 is the apparatus of any of Examples 101 to 104, wherein the ESSB is transmitted in a pattern associated with a subcarrier spacing greater than 240 kHz.

Example 106 is the apparatus of any of Examples 101 to 105, further comprising: means for refraining from transmitting the initial symbol of the ESSB; and means for switching a transmission beam during a time period for transmitting the initial symbol.

Example 107 is the apparatus of any of Examples 101 to 105, further comprising means for switching a transmission beam during a time period for transmitting the initial symbol of the ESSB, wherein the ESSB is transmitted during a portion of the time period after the switching.

Example 108 is the apparatus of any of Examples 101 to 107, further comprising means for transmitting an indication of a number of the symbols of the ESSB, a time domain pattern of ESSBs, or a partial transmission of the initial symbol of the ESSB.

Example 109 is the apparatus of Example 108, wherein the indication is for the apparatus or another base station.

Example 110 is the apparatus of Example 108 or 109, wherein the indication is transmitted in dedicated signaling.

Example 111 is the apparatus of any of Examples 108 to 110, wherein the indication includes a quantity associated with the partial transmission of the initial symbol of the ESSB.

Example 112 is the apparatus of any of Examples 101 to 111, wherein the apparatus is a standalone (SA) base station.

Example 113 is the apparatus of any of Examples 101 to 111, further comprising means for transmitting an SSB indication that the ESSB includes more than four symbols when the apparatus is a non-standalone (NSA) base station.

Example 114 is a computer-readable medium storing computer executable code, the code when executed by a processor cause the processor to: configure an extended synchronization signal block (ESSB), wherein the ESSB comprises a synchronization signal block (SSB) including four symbols and an initial symbol preceding the SSB; and transmit to a user equipment (UE) at least a portion of the ESSB.

What is claimed is:

1. A method of wireless communication at a user equipment (UE), comprising:
receiving, from a base station, an extended synchronization signal block (ESSB), wherein the ESSB comprises a synchronization signal block (SSB) including four symbols and an initial symbol preceding the SSB;
processing the ESSB; and
determining that the ESSB includes more than the four symbols in response to successfully decoding the ESSB.

2. An apparatus for wireless communication, comprising:
a processor;
memory coupled with the processor; and
instructions stored in the memory and operable, when executed by the processor, to cause the apparatus to:
receive, from a base station, an extended synchronization signal block (ESSB), wherein the ESSB comprises a synchronization signal block (SSB) including four symbols and an initial symbol preceding the SSB;
process the ESSB; and
determine that the ESSB includes more than the four symbols in response to successfully decoding the ESSB.

3. The apparatus of claim 2, wherein the initial symbol includes a physical broadcast channel (PBCH), a primary synchronization signal (PSS), or a secondary synchronization signal (SSS).

4. The apparatus of claim 2, wherein the initial symbol is a repetition of one of the symbols of the SSB.

5. The apparatus of claim 2, wherein a final symbol of the ESSB is adjacent to an initial symbol of a second ESSB.

6. The apparatus of claim 2, wherein the ESSB is received in a pattern associated with a subcarrier spacing greater than 240 KHz.

7. The apparatus of claim 2, wherein the instructions, when executed by the processor, further cause the apparatus to refrain from decoding the initial symbol of the ESSB.

8. The apparatus of claim 2, wherein the instructions, when executed by the processor, further cause the apparatus to determine that the ESSB includes more than the four symbols in response to detecting a demodulation reference signal (DMRS) in the initial symbol of the ESSB.

9. The apparatus of claim 2, wherein the instructions, when executed by the processor, further cause the apparatus to decode the initial symbol of the ESSB without determining the ESSB includes more than the four symbols.

10. The apparatus of claim 2, wherein the instructions, when executed by the processor, further cause the apparatus to determine that the ESSB includes more than the four symbols based on channel estimation from a demodulation reference signal (DMRS) in the SSB.

11. The apparatus of claim 2, wherein the instructions, when executed by the processor, further cause the apparatus to switch a reception beam during a time period for receiving the initial symbol of the ESSB.

12. The apparatus of claim 2, wherein the instructions, when executed by the processor, further cause the apparatus to maintain a reception beam between a time for receiving the ESSB and a subsequent time for receiving a second ESSB.

13. The apparatus of claim 2, wherein the instructions, when executed by the processor, further cause the apparatus to receive an indication of a number of the symbols of the ESSB, a time domain pattern of ESSBs, or a partial reception of the initial symbol of the ESSB.

14. The apparatus of claim 13, wherein the indication is for the base station or another base station.

15. The apparatus of claim 13, wherein the indication is received in dedicated signaling.

16. The apparatus of claim 13, wherein the indication includes a quantity associated with the partial reception of the initial symbol of the ESSB.

17. The apparatus of claim 2, wherein the base station is a standalone (SA) base station.

18. The apparatus of claim 2, wherein the instructions, when executed by the processor, further cause the apparatus to receive an SSB indication that the ESSB includes more than the four symbols when the base station is a non-standalone (NSA) base station.

19. An apparatus for wireless communication, comprising:
   a processor;
   memory coupled with the processor; and
   instructions stored in the memory and operable, when executed by the processor, to cause the apparatus to:
      receive a first synchronization signal block (SSB) using a reception beam; and
      determine to maintain the reception beam between the first SSB and for a second SSB or to switch the reception beam during a primary synchronization signal (PSS) symbol of the second SSB.

20. The apparatus of claim 19, wherein the instructions, when executed by the processor, further cause the apparatus to refrain from decoding the second SSB.

21. The apparatus of claim 19, wherein the instructions, when executed by the processor, further cause the apparatus to switch the reception beam during a gap between the second SSB and a third SSB.

22. The apparatus of claim 19, wherein the instructions, when executed by the processor, further cause the apparatus to switch the reception beam during the PSS symbol.

23. The apparatus of claim 19, wherein the instructions, when executed by the processor, further cause the apparatus to refrain from decoding the second SSB during a SSB-based radio resource management (RRM) Measurement Timing Configuration (SMTC) window.

24. An apparatus for wireless communication, comprising:
   a processor;
   memory coupled with the processor; and
   instructions stored in the memory and operable, when executed by the processor, to cause the apparatus to:
      configure an extended synchronization signal block (ESSB), wherein the ESSB comprises a synchronization signal block (SSB) including four symbols and an initial symbol preceding the SSB;
      transmit to a user equipment (UE) at least a portion of the ESSB; and
      transmit an SSB indication that the ESSB includes more than four symbols when the apparatus is a non-standalone (NSA) base station.

25. The apparatus of claim 24, wherein the instructions, when executed by the processor, further cause the apparatus to:
   refrain from transmitting the initial symbol of the ESSB; and
   switch a transmission beam during a time period for transmitting the initial symbol.

26. The apparatus of claim 24, wherein the instructions, when executed by the processor, further cause the apparatus to switch a transmission beam during a time period for transmitting the initial symbol of the ESSB, wherein the ESSB is transmitted during a portion of the time period after the switching.

27. The apparatus of claim 24, wherein the instructions, when executed by the processor, further cause the apparatus to transmit an indication of a number of the symbols of the ESSB, a time domain pattern of ESSBs, or a partial transmission of the initial symbol of the ESSB.

\* \* \* \* \*